（12）United States Patent
Tabata et al.

(10) Patent No.: US 7,249,642 B2
(45) Date of Patent: Jul. 31, 2007

(54) CONTROL APPARATUS FOR CONTROLLING VEHICLE DRIVE APPARATUS, AND VEHICLE DRIVE SYSTEM INCLUDING THE CONTROL APPARATUS

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 99 days.

(21) Appl. No.: 11/144,694

(22) Filed: Jun. 6, 2005

(65) Prior Publication Data

US 2005/0279546 A1 Dec. 22, 2005

(30) Foreign Application Priority Data

Jun. 7, 2004 (JP) ............................. 2004-168423

(51) Int. Cl.
*B60K 1/00* (2006.01)
(52) U.S. Cl. ..................................... 180/65.2; 180/65.6
(58) Field of Classification Search ............... 180/65.2, 180/65.3, 65.5, 65.6, 65.8; 903/903, 914, 903/922, 940; 701/22, 102; 318/34, 140; 377/3
See application file for complete search history.

(56) References Cited

U.S. PATENT DOCUMENTS

| | | | | |
|---|---|---|---|---|
| 4,335,429 A * | 6/1982 | Kawakatsu | ............... | 701/102 |
| 5,789,882 A | 8/1998 | Ibaraki et al. | | |
| 6,991,581 B2 * | 1/2006 | Murakami et al. | ............. | 477/3 |
| 7,053,566 B2 * | 5/2006 | Aizawa et al. | ............... | 318/34 |
| 2003/0078134 A1 * | 4/2003 | Kojima et al. | ................ | 477/3 |
| 2004/0158365 A1 * | 8/2004 | Tabata et al. | ................ | 701/22 |
| 2004/0254046 A1 * | 12/2004 | Ozeki et al. | .................. | 477/3 |
| 2005/0001480 A1 * | 1/2005 | Tabata et al. | ............... | 303/141 |
| 2005/0014601 A1 * | 1/2005 | Miura et al. | .................. | 477/2 |
| 2005/0029023 A1 * | 2/2005 | Takami et al. | ............ | 180/65.3 |

FOREIGN PATENT DOCUMENTS

| | | |
|---|---|---|
| JP | H09-98516 A | 4/1997 |
| JP | 2001-41073 A | 2/2001 |
| JP | 2003-127681 A | 5/2003 |
| JP | 2003-130203 A | 5/2003 |

* cited by examiner

*Primary Examiner*—Hau Phan
(74) *Attorney, Agent, or Firm*—Kenyon & Kenyon LLP

(57) ABSTRACT

A control apparatus for controlling a vehicle drive apparatus including: (i) a power transmitting member; (ii) a differential mechanism which has a first element connected to an engine, a second element connected to a first electric motor, and a third element connected to a second electric motor and the power transmitting member; (iii) an automatic transmission constituting at least a part of a power transmitting path between the power transmitting member and a drive wheel; and (iv) a differential-state switching device operable to selectively place the differential mechanism in its differential state in which the second and third elements are rotatable at respective different speeds, and in its non-differential state in which the second and third elements are not rotatable at respective different speeds. The control apparatus includes a switching device controller operable to cause the differential-state switching device to place the differential mechanism in the differential state, at least during generation of an electric energy by the first electric motor and/or second electric motor while the power transmitting path is being disconnected. Also disclosed is a vehicle drive system including the above-described control apparatus.

17 Claims, 17 Drawing Sheets

|  | C0 | C1 | C2 | B0 | B1 | B2 | B3 | SPEED RATIOS | RATIO STEPS |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | RATIO SPREAD 4.76 |
| R |  |  | ○ |  |  |  | ○ | 3.209 |  |
| N | △ |  |  |  |  |  |  |  |  |

○ ENGAGED

◎ ENGAGED FOR STEP-VARIABLE SHIFTING, AND RELEASED FOR CONTINUOUSLY-VARIABLE SHIFTING

△ ENGAGED EXCEPT DURING ELECTRICITY GENERATION, AND RELEASED DURING ELECTRICITY GENERATION

|  | C0 | C1 | C2 | B0 | B1 | B2 | SPEED RATIOS | RATIO STEPS |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | RATIO SPREAD 3.977 |
| R |  |  | ○ |  |  | ○ | 2.393 |  |
| N | △ |  |  |  |  |  |  |  |

○ ENGAGED

◎ ENGAGED FOR STEP-VARIABLE SHIFTING, AND RELEASED FOR CONTINUOUSLY-VARIABLE SHIFTING

△ ENGAGED EXCEPT DURING ELECTRICITY GENERATION, AND RELEASED DURING ELECTRICITY GENERATION

CONTROL APPARATUS FOR CONTROLLING VEHICLE DRIVE APPARATUS, AND VEHICLE DRIVE SYSTEM INCLUDING THE CONTROL APPARATUS

This application is based on Japanese Patent Application No. 2004-168423 filed in Jun. 7, 2004, the content of which is incorporated hereinto by reference.

BACKGROUND OF THE INVENTION

1. Field of the Invention

The present invention relates in general to a control apparatus for controlling a vehicle drive apparatus which is equipped with a differential mechanism serving as a speed variable transmission owing to its differential action. More particularly, the invention is concerned with techniques for improving an efficiency of electricity generation while a drive power transmitting path is being disconnected.

2. Discussion of Related Art

There is known a hybrid vehicle drive apparatus including: (i) a power transmitting member; and (ii) a differential mechanism having a first element connected to an internal combustion engine, a second element connected to a first electric motor having an electricity generating function, and a third element connected to the power transmitting member and a second electric motor which is connectable to the first electric motor through an electric path, as disclosed in JP-2000-238555A, JP-2003-130203A and JP-2003-127681A. The differential mechanism of the drive apparatus serves as a power distributing mechanism for distributing a drive power or force of the engine to the first electric motor and the power transmitting member. The differential mechanism is constituted by a planetary gear set whose differential action permits a major portion of the drive force of the engine to be mechanically transmitted to drive wheels and also permits the rest of the drive force to be electrically transmitted from the first electric motor to the second electric motor through the electric path, so as to serve as a speed variable transmission capable of electrically changing its speed ratio, thereby making it possible to drive the vehicle with the engine kept in an optimum operating state with a reduced fuel consumption. Further, as other prior arts relating to the present invention, JP-H09-98516A discloses a technique for reducing a fuel consumption of a hybrid vehicle, and JP-2001-41073A discloses a technique for improving an efficiency of an electricity generation performed by a generator which is driven by a vehicle engine. Specifically, JP-2001-41073A teaches releasing a clutch during the electricity generation, for avoiding of transmission of a rotary motion of the engine to a fluid coupling (torque converter) which is disposed on one of opposite sides of the clutch remote from the engine, so as to improve the electricity generation efficiency.

In the above-described hybrid vehicle drive apparatus, when the electricity generation is intended with the drive apparatus being placed in its non-driving position such as a neutral position, the rotational speed of the second element has to be increased to such a value that permits the rotational speed of the power transmitting member to be zeroed. This means that the rotational speed of the first electric motor connected to the second element can not be freely determined, namely, the first electric motor as a generator can not be operated at such an operating point that maximizes the efficiency of the electricity generation. That is, in the above-described hybrid vehicle drive apparatus, there is a limit to improvement of the generation efficiency. In view of this, there has been a demand for a control apparatus capable of maximizing the efficiency of the electricity generation as intended while the drive apparatus is placed in the non-driving position, in the vehicle drive apparatus equipped with the differential mechanism serving as the speed variable transmission owing to its differential action.

SUMMARY OF THE INVENTION

The present invention was made in the light of the background art discussed above. It is therefore a first object of the present invention to provide a control apparatus capable of maximizing an efficiency of generation of an electric energy while a vehicle drive apparatus is placed in its non-driving position, in the vehicle drive apparatus equipped with a differential mechanism serving as a speed variable transmission owing to its differential action. It is a second object of the invention to provide a vehicle drive system in which it is possible to maximize the efficiency of the electric energy generation while the drive apparatus is placed in its non-driving position. The first object may be achieved according to any one of first through eighth aspects of the invention which are described below. The second object may be achieved according to any one of ninth through twelfth aspects of the invention which are described below.

The first aspect of this invention provides a control apparatus for controlling a vehicle drive apparatus including: (i) a power transmitting member; (ii) a differential mechanism which has a first element connected to an engine, a second element connected to a first electric motor, and a third element connected to a second electric motor and the power transmitting member, and which distributes a drive power of the engine to the first electric motor and the power transmitting member; (iii) an automatic transmission constituting at least a part of a power transmitting path between the power transmitting member and a drive wheel; and (iv) a differential-state switching device operable to selectively place the differential mechanism in a differential state thereof in which at least the second and third elements are rotatable at respective speeds different from each other, and in a non-differential state thereof in which at least the second and third elements are not rotatable at respective speeds different from each other, the control apparatus including: a switching device controller operable to cause the differential-state switching device to place the differential mechanism in the differential state, at least during generation of an electric energy by at least one of the first and second electric motors while the power transmitting path is being disconnected, namely, while the drive apparatus or automatic transmission is placed in its non-driving position.

According to the second aspect of the invention, the control apparatus defined in the first aspect of the invention further includes a power-transmitting-path disconnection determiner operable to determine that the power transmitting path is disconnected when the drive apparatus or automatic transmission is placed in one of a neutral position thereof and a parking position thereof, wherein the switching device controller causes the differential-state switching device to place the differential mechanism in the differential state, at least during the generation of the electric energy when the power-transmitting-path disconnection determiner determines that the power transmitting path is disconnected.

According to the third aspect of the invention, the control apparatus defined in the first or second aspect of the invention further includes a generation controller operable to control the first and second electric motors during the generation of the electric energy while the power transmitting path is being disconnected, such that the first and second electric motors are operated at respective operating points thereof different from each other, for generating the electric energy.

According to the fourth aspect of the invention, in the control apparatus defined in the third aspect of the invention, the generation controller controls the first and second electric motors during the generation of the electric energy while the power transmitting path is being disconnected, such that the electric energy is generated by rotations of the respective first and second electric motors, with at least one of rotational speed and torque of the first electric motor being different from that of the second electric motor.

According to the fifth aspect of the invention, in the control apparatus defined in the third or fourth aspect of the invention, the generation controller controls the first and second electric motors during the generation of the electric energy, such that a total generation efficiency of the first and second electric motors is maximized.

According to the sixth aspect of the invention, the control apparatus defined in any one of the first through fifth aspects of the invention further includes a pump controller operable to control an electrically-operated hydraulic pump which supplies a pressurized working fluid to the automatic transmission, such that a pressure of the working fluid supplied to the automatic transmission is reduced to substantially zero, at least during the generation of the electric energy while the power transmitting path is being disconnected.

According to the seventh aspect of the invention, the control apparatus defined in any one of the first through fifth aspects of the invention further includes: a generation request determiner operable to make a determination as to whether the generation of the electric energy is requested or not, on the basis of an amount of the electric energy remaining in an electric-energy storage device; a power-transmitting-path disconnection determiner operable to make a determination as to whether the power transmitting path is disconnected or not, depending upon whether or not the drive apparatus or automatic transmission is placed in one of a neutral position thereof and a parking position thereof, and a pump controller operable to control an electrically-operated hydraulic pump which supplies a pressurized working fluid to the automatic transmission, such that a pressure of the working fluid supplied to the automatic transmission is made lower when an affirmative decision is obtained in both of the determinations made by the generation request determiner and the power-transmitting-path disconnection determiner, respectively, than when a negative decision is obtained in at least one of the determinations made by the generation request determiner and the power-transmitting-path disconnection determiner, respectively.

According to the eighth aspect of the invention, in the control apparatus defined in any one of the first through seventh aspects of the invention, the switching device controller causes the differential-state switching device to place the differential mechanism in a continuously-variable shifting state thereof as the differential state in which the differential mechanism functions as a continuously variable transmission permitting a ratio between rotational speeds of the respective second and third elements to be continuously variable, at least during the generation of the electric energy while the power transmitting path is being disconnected.

The ninth aspect of this invention provides a vehicle drive system having: (a) a vehicle drive apparatus including: (a-i) a power transmitting member; (a-ii) a differential mechanism which has a first element connected to an engine, a second element connected to a first electric motor, and a third element connected to a second electric motor and the power transmitting member, and which distributes a drive power of the engine to the first electric motor and the power transmitting member; (a-iii) an automatic transmission constituting at least a part of a power transmitting path between the power transmitting member and a drive wheel; and (a-iv) a differential-state switching device operable to selectively place the differential mechanism in a differential state thereof in which at least the second and third elements are rotatable at respective speeds different from each other, and in a non-differential state thereof in which at least the second and third elements are not rotatable at respective speeds different from each other; and (b) the control apparatus defined in any one of the first through eighth aspects of the invention and provided for controlling the vehicle drive apparatus.

According to the tenth aspect of the invention, in the vehicle drive system defined in the ninth aspect of the invention, the differential mechanism is a switchable transmission switchable between a step-variable shifting state thereof as the non-differential state in which the differential mechanism functions as a step variable transmission, and a continuously-variable shifting state thereof as the differential state in which the differential mechanism functions as a continuously variable transmission permitting a ratio between rotational speeds of the respective second and third elements to be continuously variable, wherein the switching device controller causes the differential-state switching device to place the differential mechanism in the continuously-variable shifting state thereof, at least during the generation of the electric energy while the power transmitting path is being disconnected.

According to the eleventh aspect of the invention, in the vehicle drive system defined in the tenth aspect of the invention, the switchable transmission as the differential mechanism includes a planetary gear set, such that the first element connected to the engine is provided by a carrier of the planetary gear set, such that the second element connected to the first electric motor is provided by a sun gear of the planetary gear set, and such that the third element connected to the second electric motor is provided by a ring gear of the planetary gear set, wherein the differential-state switching device includes at least one of a clutch selectively engaged and disengaged for connecting and disconnecting two of the carrier, sun gear and ring gear to and from each other, and a brake selectively engaged and disengaged for connecting and disconnecting the sun gear to and from a stationary member, and wherein each of the above-described at least one of the clutch and the brake of the differential-state switching device is disengaged to place the differential mechanism in the continuously-variable shifting state thereof, at least during the generation of the electric energy while the power transmitting path is being disconnected.

According to the twelfth aspect of the invention, in the vehicle drive system defined in any one of the ninth through eleventh aspects of the invention, the automatic transmission is connectable to the power transmitting member through at least one clutch which is disposed between the automatic transmission and the power transmitting member, wherein the above-described at least one clutch is selectively engaged and disengaged for connecting and disconnecting the automatic transmission to and from the power transmitting member, so as to selectively connecting and disconnecting the power transmitting path.

In the control apparatus or drive system of each of the first through twelfth aspects of the invention, during the generation of the electric energy while the power transmitting path is being disconnected, namely, while the transmission is placed in its non-driving position, the switching device controller of the control apparatus places the differential mechanism in its differential state in which at least the second and third elements are rotatable at respective different speeds, rather than in its non-differential state in which at least the second and third elements are not rotatable at respective different speeds, namely, in which the first through third elements are rotated as a unit or in which the second element is not rotatable. The placement of the differential mechanism in its differential state provides a higher degree of freedom in determining the rotational speeds of the first and second electric motors which are connected to the second and third elements, respectively, thereby allowing the first and second electric motors to be operated at preferable operating points. That is, the control apparatus or drive system constructed according to the invention is capable of maximizing an efficiency of an electric energy generation as intended while the power transmitting path is being disconnected, in the vehicle drive apparatus equipped with the differential mechanism serving as a speed variable transmission owing to its differential action.

In the control apparatus of each of the third through fifth aspects of the invention, the generation controller is provided to control the first and second electric motors during the generation of the electric energy while the power transmitting path is being disconnected, such that the first and second electric motors are operated at respective operating points different from each other, thereby enabling the first and second electric motors to be operated at further preferable operating points.

In the control apparatus of the fifth aspect of the invention, the generation controller is arranged to control the first and second electric motors during the generation of the electric energy, such that the overall generation efficiency of the first and second electric motors is maximized, thereby enabling the first and second electric motors to be operated at optimum operating points.

In the control apparatus of the sixth or seventh aspect of the invention, the pump controller is provided to control the electrically-operated hydraulic pump, such that the pressure of the working fluid supplied from the pump to the automatic transmission is reduced or substantially zeroed during the generation of the electric energy while the power transmitting path is being disconnected. This arrangement is effective to reduce the electric energy consumed by activation of the pump and improve a fuel economy of the vehicle.

In the control apparatus or drive system of each of the eighth, tenth and eleventh aspects of the invention, during the generation of the electric energy while the power transmitting path is being disconnected, the differential mechanism is placed in its continuously-variable shifting state as the differential state in which the differential mechanism functions as the continuously variable transmission permitting the ratio between the rotational speeds of the respective second and third elements to be continuously variable. In this arrangement, since the ratio between the rotational speeds of the respective second and third elements is continuously variable, the rotational speeds of the respective first and second electric motors connected to the respective second and third elements can be freely determined, whereby the operations of the first and second electric motors at desired operating points are facilitated.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Referring first to FIGS. 1-18, there will be described in detail a first embodiment of the present invention.

Figures 1, 2:
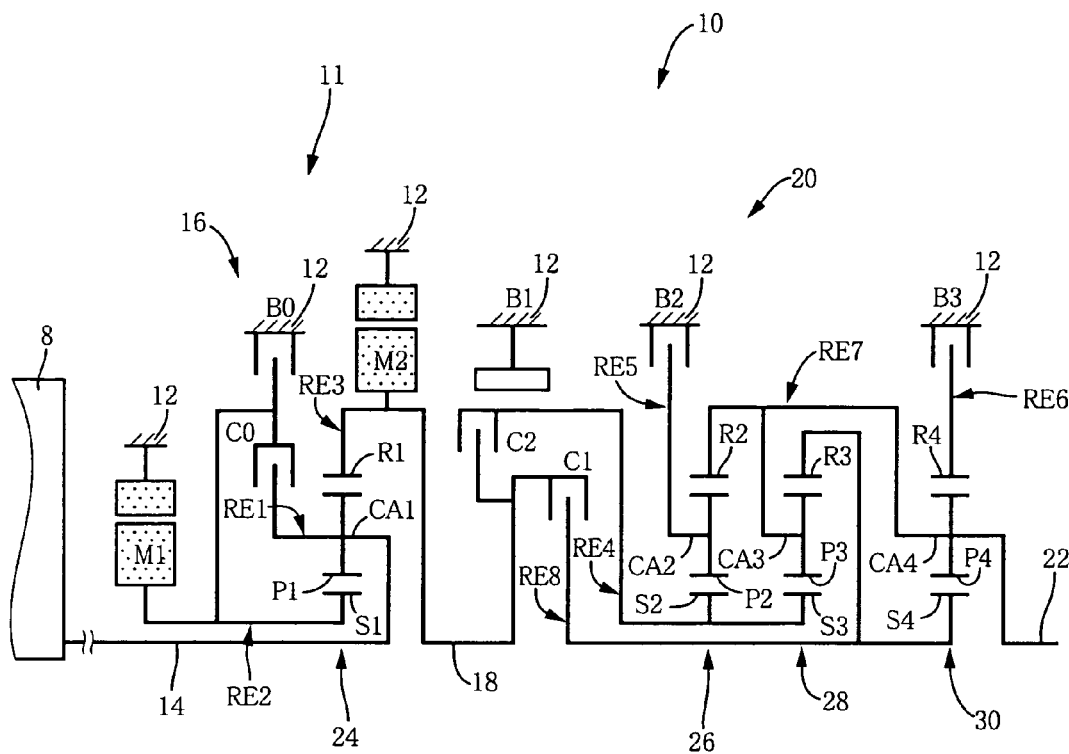
FIG. 1 is a schematic view illustrating a basic arrangement of a drive apparatus incorporated in a hybrid vehicle drive system which is constructed according to an embodiment of the present invention.
FIG. 2 is a table indicating shifting actions of the drive apparatus of FIG. 1 operable in a continuously variable shifting state or a step-variable shifting state, in relation to different combinations of operating states of hydraulically operated frictional coupling devices to effect the respective shifting actions.
Figure 7:
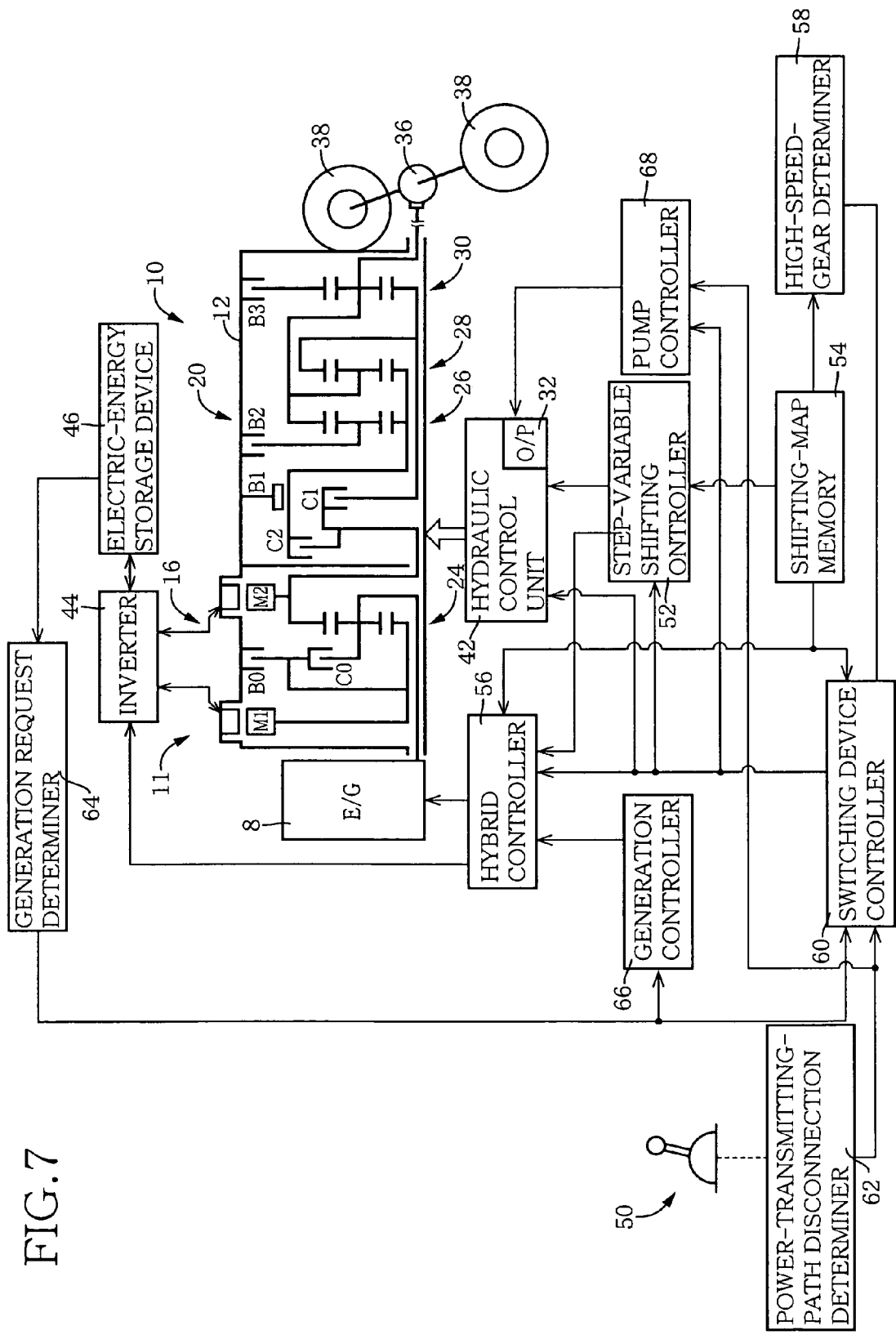
FIG. 7 is a functional block diagram showing various functional means incorporated in the ECU of FIG. 6.

FIG. 1 is a schematic view showing a transmission mechanism 10 which constitutes a part of a drive apparatus for a hybrid vehicle. The transmission mechanism 10 includes: an input rotary member in the form of an input shaft 14 disposed on a common axis in a transmission casing 12 functioning as a stationary member attached to a body of the vehicle; a differential portion 11 connected to the input shaft 14 either directly, or indirectly via a pulsation absorbing damper or vibration damping device (not shown); a step-variable or multiple-step automatic transmission portion 20 interposed between and connected in series via a power transmitting shaft or member 18 to the differential portion 11 and a pair of drive wheels 38; and an output rotary member in the form of an output shaft 22 connected to the transmission portion 20. In this transmission mechanism 10, the input shat 14, differential portion 11, transmission portion 20 and output shaft 22 are connected in series with each other. This transmission mechanism 10 is suitably used for a transverse FR vehicle (front-engine, rear-drive vehicle), and is disposed between a drive power source in the form of a gasoline or diesel engine 8 and the pair of drive wheels 38, so as to transmit a drive power or force as an output of the engine 8 to the pair of drive wheels 38 through a power transmitting path which has parts constituted by a differential gear device 36 (final speed reduction gear) and a pair of drive axles, as shown in FIG. 7. It is noted that a lower half of the transmission mechanism 10, which is constructed symmetrically with respect to its axis, is omitted in FIG. 1.

The differential portion 11 of the transmission mechanism 10 includes: a first electric motor M1; a power distributing mechanism 16 functioning as a differential mechanism operable to mechanically distribute the output of the engine 8 transmitted to the input shaft 14, to the first electric motor M1 and the power transmitting member 18; and a second electric motor M2 rotatable integrally with the power transmitting member 18. It is noted that the second electric motor M2 may be disposed in any part of the power transmitting path between the power transmitting member 18 and the drive wheels 38.

In the present embodiment, each of the first electric motor M1 and the second electric motor M2 is a so-called motor/generator also functioning as an electric generator. However, the first electric motor M1 may be adapted to function exclusively as an electric generator operable to generate an electric energy while generating a reaction force, while the second electric motor M2 may be adapted to function exclusively as an electric motor operable to generate a vehicle drive force. Both of the first and second electric motors M1, M2 cooperate with the engine 8 to function as a drive power source for driving the vehicle.

The power distributing mechanism 16 includes, as major components, a first planetary gear set 24 of single pinion type having a gear ratio ρ1 of about 0.418, a switching clutch C0 and a switching brake B1. The first planetary gear set 24 has rotary members consisting of a first sun gear S1; first planetary gear P1; a first carrier CA1 supporting the first planetary gears P1 such that each of the first planetary gears P1 is rotatable about its axis and about the axis of the first sun gear S1; and a first ring gear R1 meshing with the first sun gear S1 through the first planetary gears P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the carrier CA1 is connected to the input shaft 14, i.e., to the engine 8, and constitutes a first rotary element RE1 (first element) of the mechanism 16. The sun gear S1 is connected to the first electric motor M1, and constitutes a second rotary element RE2 (second element) of the mechanism 16. The ring gear R1 is connected to the power transmitting member 18, and constitutes a third rotary element RE3 (third element) of the mechanism 16. The power distributing mechanism 16 distributes the output of the engine 8 to the first electric motor M1 through the secondary rotary element RE2, and to the power transmitting member 18 through the third rotary element RE3, so that a portion of the output of the engine 8 is used to drive the first electric motor M1 to generate an electric energy which is stored or used to drive the second electric motor M2. The switching brake B0 is disposed between the sun gear S1 and the transmission casing 12, while the switching clutch C0 is disposed between the sun gear S1 and the carrier CA1. When the switching clutch C0 and brake B0 are both released, the power distributing mechanism 16 is placed in its differential state in which the sun gear S1, carrier CA1 and ring gear R1 are rotatable at respective speeds different from each other, so as to become capable of performing a differential function, so that the output of the engine 8 can be distributed to the first electric motor M1 and the power transmitting member 18 with a variable distribution ratio. That is, the power distributing mechanism 16 is placed in a so-called continuously-variable shifting state (electrically established CVT state), in which the rotational speed of the power transmitting member 18 is continuously variable, irrespective of the rotational speed of the engine 8, namely, in the differential state in which a speed ratio $\gamma 0$ (=rotational speed of the input shaft 14/rotational speed of the power transmitting member 18) of the power distributing mechanism 16 is electrically changed from a minimum value $\gamma 0\min$ to a maximum value $\gamma 0\max$, for instance, in the continuously-variable shifting state in which the power distributing mechanism 16 functions as an electrically controlled continuously variable transmission the speed ratio $\gamma 0$ of which is continuously variable from the minimum value $\gamma 0\min$ to the maximum value $\gamma 0\max$.

When the switching clutch C0 or brake B0 is engaged during running of the vehicle with the output of the engine 8 while the power distributing mechanism 16 is placed in the continuously-variable shifting state, the mechanism 16 is brought into its locked state or non-differential state in which the differential function is not available, namely, the sun gear S1, carrier CA1 and ring gear R1 are not rotatable at respective speeds different from each other. Described in detail, when the switching clutch C0 is engaged, the sun gear S1 and the carrier CA1 are connected together, whereby the power distributing mechanism 16 is placed in the non-differential state in which the three rotary elements RE1-RE3 of the first planetary gear set 24 consisting of the sun gear S1, carrier CA1 and ring gear R1 are rotatable as a unit, so that the rotational speed of the engine 8 and the rotational speed of the power transmitting member 18 are made equal to each other. That is, the power distributing mechanism 16 is placed in its fixed-speed-ratio state in which the mechanism 16 functions as a transmission having a fixed speed ratio $\gamma 0$ equal to 1. When the switching brake B0 is engaged in place of the switching clutch C0, the sun gear S1 is fixed to the transmission casing 12, so that the power distributing mechanism 16 is placed in the non-differential state in which the sun gear S1 is not rotatable. Since the rotational speed of the ring gear R1 is made higher than that of the carrier CA1, the power distributing mechanism 16 is placed in another fixed-speed-ratio state in which the mechanism 16 functions as a speed-increasing transmission having a fixed speed ratio $\gamma 0$ smaller than 1, for example, about 0.7. In the present embodiment, the switching clutch C0 and brake B0 function as a differential-state switching device operable to selectively place the power distributing mechanism 16 in the differential state (continuously-variable shifting state or non-locked state) in which the mechanism 16 functions as the electrically controlled continuously variable transmission the speed ratio of which is continuously variable, and in the locked or non-differential state in which the mechanism 16 does not function as the electrically controlled continuously variable transmission. Namely, the switching clutch C0 and brake B0 function as the differential-state switching device operable to switch the power distributing mechanism 16 between a differential state, and a fixed-speed-ratio shifting state in which the mechanism 16 functions as a transmission having a single gear position with one speed ratio or a plurality of gear positions with respective speed ratios. It is also noted that the differential portion 11 consisting of the first electric motor M1, the second electric motor M2 and the power distributing mechanism 16 cooperate to function as a shifting-state switchable type shifting portion (mechanism) which is switchable between a continuously-variable shifting state or state in which the shifting portion 11 is operated as an electrically controlled continuously variable transmission the speed ratio of which is continuously variable, and a locked state in which the shifting portion 11 does not function as the electrically controlled continuously variable transmission but functions as a transmission having a single gear position with one speed ratio or a plurality of gear positions with respective speed ratios. The power distributing mechanism 16 described above functions as a switchable type differential (planetary) gear device switchable between a locked state and a non-locked state.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; second planetary gears P2; a second carrier CA2 supporting the second planetary gears P2 such that each of the second planetary gears P2 is rotatable about its axis and about the axis of the second sun gear S2; and a second ring gear R2 meshing with the second sun gear S2 through the second planetary gears P2. For example, the second planetary gear set 26 has a gear ratio $\rho 2$ of about 0.562. The third planetary gear set 28 has: a third sun gear S3; third planetary gears P3; a third carrier CA3 supporting the third planetary gears P3 such that each of the third planetary gears P3 is rotatable about its axis and about the axis of the third sun gear S3; and a third ring gear R3 meshing with the third sun gear S3 through the third planetary gears P3. For example, the third planetary gear set 28 has a gear ratio $\rho 3$ of about 0.425. The fourth planetary gear set 30 has: a fourth sun gear S4; fourth planetary gears P4; a fourth carrier CA4 supporting the fourth planetary gears P4 such that each of the fourth planetary gears P4 is rotatable about its axis and about the axis of the fourth sun gear S4; and a fourth ring gear R4 meshing with the fourth sun gear S4 through the fourth planetary gears P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2, ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicle automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ(=input shaft speed $N_{IN}$/output shaft speed $N_{OUT}$) which change substantially in geometric progression. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present transmission mechanism 10, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. Namely, the transmission mechanism 10 functions as a transmission mechanism of switchable type switchable between the continuously-variable shifting state in which the transmission mechanism 10 is operable as an electrically controlled continuously variable transmission, and the step-variable shifting state in which the transmission mechanism 10 operable as the step-variable transmission. The differential portion 11 is also considered to be a transmission switchable between the step-variable shifting state and the continuously-variable shifting state.

Where the transmission mechanism 10 functions as the step-variable transmission, for example, the first-gear position having the highest speed ratio γ1 of about 3.357, for example, is established by engaging actions of the switching clutch C0, first clutch C1 and third brake B3, and the second-gear position having the speed ratio γ2 of about 2.180, for example, which is lower than the speed ratio γ1, is established by engaging actions of the switching clutch C0, first clutch C1 and second brake B2, as indicated in FIG. 2. Further, the third-gear position having the speed ratio γ3 of about 1.424, for example, which is lower than the speed ratio γ2, is established by engaging actions of the switching clutch C0, first clutch C1 and first brake B1, and the fourth-gear position having the speed ratio γ4 of about 1.000, for example, which is lower than the speed ratio γ3, is established by engaging actions of the switching clutch C0, first clutch C1 and second clutch C2. The fifth-gear position having the speed ratio γ5 of about 0.705, for example, which is smaller than the speed ratio γ4, is established by engaging actions of the first clutch C1, second clutch C2 and switching brake B0. Further, the reverse-gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0, or by engaging none of the frictional coupling devices. That is, while the neutral position N is selected, the switching clutch C0 is engaged except during the generation of the electric energy by the first electric motor M1 and/or the second electric motor M2, and is released during the generation of the electric energy (see FIG. 2).

Where the transmission mechanism 10 functions as the continuously-variable transmission, on the other hand, the switching clutch C0 and the switching brake B0 are both released, as indicated in FIG. 2, so that the differential portion 11 functions as the continuously variable transmission, while the transmission portion 20 connected in series to the differential portion 11 functions as the step-variable transmission, whereby the speed of the rotary motion transmitted to the transmission portion 20 placed in one of the first-gear, second-gear, third-gear and fourth-gear positions, namely, the rotational speed of the power transmitting member 18 is continuously changed, so that the speed ratio of the transmission mechanism 10 when the transmission portion 20 is placed in one of those gear positions is continuously variable over a predetermined range. Accordingly, the speed ratio of the transmission portion 20 is continuously variable across the adjacent gear positions, whereby the overall speed ratio γT of the transmission mechanism 10 is continuously variable.

Figure 3:
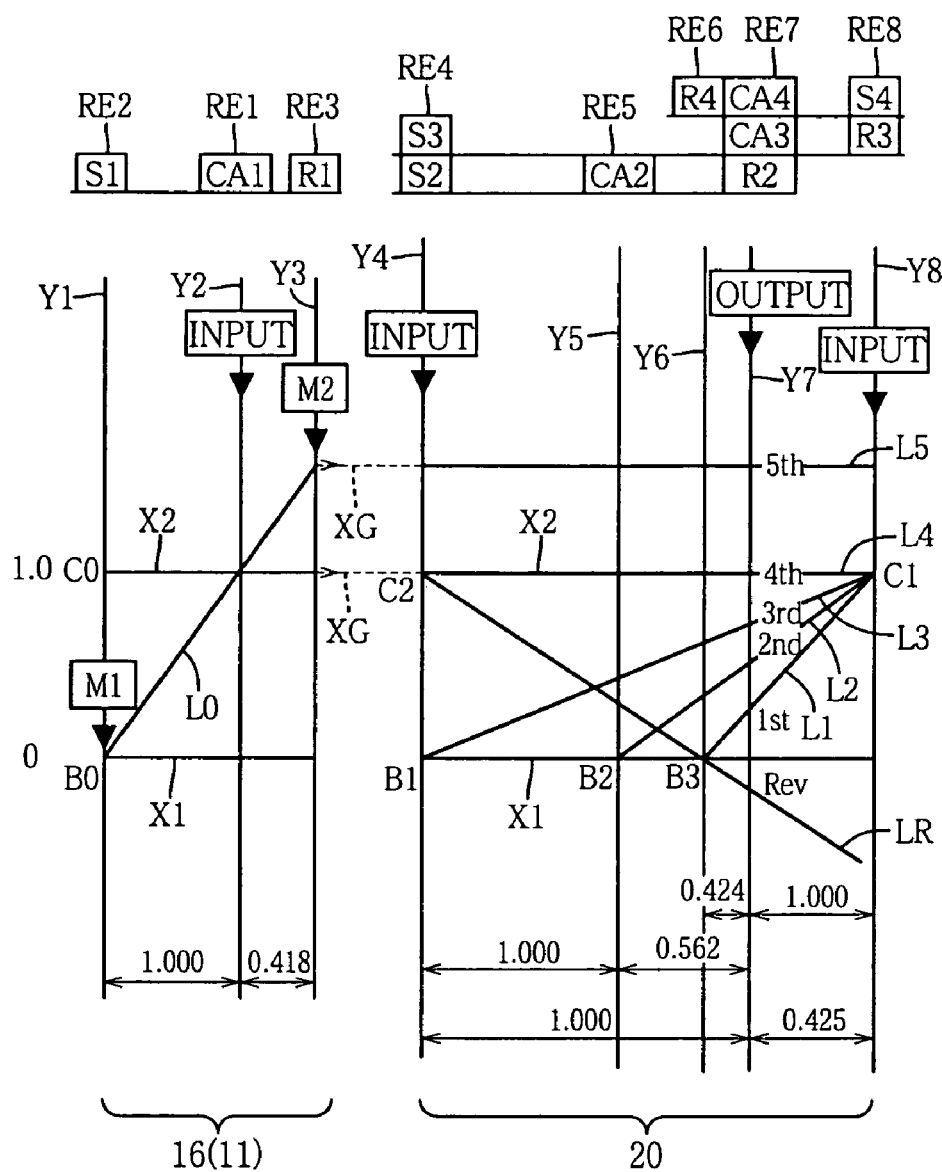
FIG. 3 is a collinear chart showing relative rotational speeds of a plurality of rotary elements incorporated in the drive apparatus of FIG. 1 as operated in the step-variable shifting action, in different drive positions of the drive system.

FIG. 3 is a collinear chart indicating, by straight lines, a relationship among the rotational speeds of the rotary elements in each of the gear positions of the transmission mechanism 10, which is constituted by the differential portion 11 or power distributing mechanism 16 functioning as the continuously-variable shifting portion or first shifting portion, and the transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotational speeds of the rotary elements are taken along the vertical axis. A lower one of three horizontal lines X1, X2, XG, that is, the horizontal line X1 indicates the rotational speed of 0, while an upper one of the three horizontal lines, that is, the horizontal line X2 indicates the rotational speed of 1.0, that is, an operating speed $N_E$ of the engine 8 connected to the input shaft 14. The horizontal line XG indicates the rotational speed of the power transmitting member 18.

Three vertical lines Y1, Y2 and Y3 corresponding to the power distributing mechanism 16 which principally constitutes the differential portion 11 respectively represent the relative rotational speeds of the second rotary element (second element) RE2 in the form of the first sun gear S1, the first rotary element (first element) RE1 in the form of the first carrier CA1, and the third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotational speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio ρ.

Referring to the collinear chart of FIG. 3, the power distributing mechanism (continuously variable shifting portion) 16 or differential portion 11 of the transmission mechanism 10 is arranged such that the first rotary element RE1 (first carrier CA1) of the first planetary gear set 24 is integrally fixed to the input shaft 14 and selectively connected to the second rotary element RE2 (first sun gear S1) through the switching clutch C0, such that the second rotary element RE2 (first sun gear S1) is fixed to the first electric motor M1 and selectively fixed to the transmission casing 12 through the switching brake B0, and such that the third rotary element RE3 (first ring gear R1) is fixed to the power transmitting member 18 and the second electric motor M2, whereby a rotary motion of the input shaft 14 is transmitted to the transmission portion (step-variable transmission) 20 through the power transmitting member 18. A relationship between the rotational speeds of the first sun gear S1 and the first ring gear R1 is represented by an inclined straight line L0 which passes a point of intersection between the lines Y2 and X2.

Figure 4:
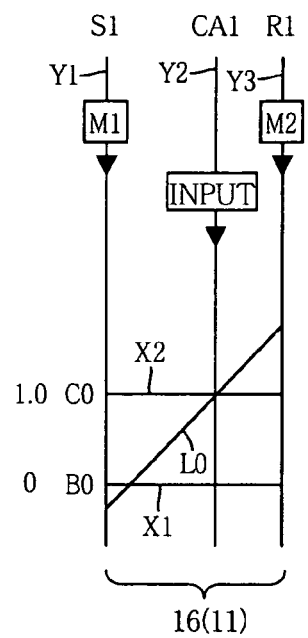
FIG. 4 is a view showing an example of an operating state of a power distributing mechanism (differential portion) of the drive apparatus when switched to its continuously-variable shifting state (differential state), and corresponding to a part of the collinear chart of FIG. 3 which part shows the power distributing mechanism.
Figure 5:
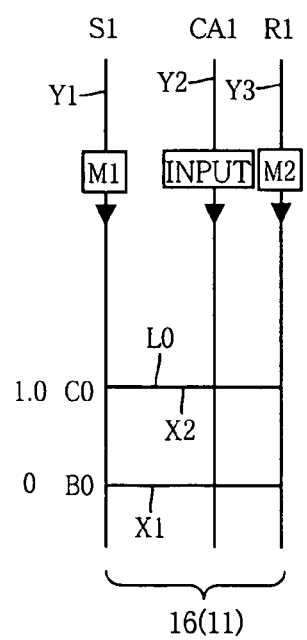
FIG. 5 is a view showing an operating state of the power distributing mechanism when switched to its step-variable shifting state (non-differential state) by engagement of a switching clutch C0, and corresponding to the part of the collinear chart of FIG. 3 which part shows the power distributing mechanism.

Each of FIGS. 4 and 5 corresponds to a part of the collinear chart of FIG. 3 which shows the differential portion 11 or the power distributing mechanism 16. FIG. 4 shows an example of an operating state of the power distributing mechanism 16 placed in the continuously-variable shifting state (differential state) with the switching clutch C0 and the switching brake B0 both held in the released state. The rotational speed of the first sun gear S1 represented by the point of intersection between the straight line L0 and vertical line Y1 is raised or lowered by controlling the reaction force generated by an operation of the first electric motor M1 to generate an electric energy, so that the rotational speed of the first ring gear R1 represented by the point of intersection between the lines L0 and Y3 is lowered or raised.

FIG. 5 shows an example of an operating state of the differential portion 11 or the power distributing mechanism 16 placed in the fixed-speed-ratio shifting state (step-variable shifting state) with the switching clutch C0 held in the engaged state. When the first sun gear S1 and the first carrier CA1 are connected to each other in this fixed-speed-ratio shifting state, the power distributing mechanism 16 is placed in the non-differential state in which the three rotary elements indicated above are rotated as a unit, so that the line L0 is aligned with the horizontal line X2, whereby the power transmitting member 18 is rotated at a speed equal to the engine speed $N_E$. When the switching brake B0 is engaged, on the other hand, the rotation of the first sun gear S1 is stopped, and the power distributing mechanism 16 is placed in the non-differential state in which the mechanism 16 functions as a speed-increasing device, so that the straight line L0 is inclined in the state indicated in FIG. 3, whereby the rotational speed of the first ring gear R1, that is, the rotation of the power transmitting member 18 represented by a point of intersection between the straight line L0 and vertical line Y3 is made higher than the engine speed $N_E$ and transmitted to the transmission portion 20.

In the transmission portion 20, the fourth rotary element RE4 is selectively connected to the power transmitting member 18 through the second clutch C2, and selectively fixed to the casing 12 through the first brake B1. The fifth rotary element RE5 is selectively fixed to the casing 12 through the second brake B2. The sixth rotary element RE6 is selectively fixed to the casing 12 through the third brake B3. The seventh rotary element RE7 is fixed to the output shaft 22. The eighth rotary element RE8 is selectively connected to the power transmitting member 18 through the first clutch C1.

When the first clutch C1 and the third brake B3 are engaged, the transmission portion 20 is placed in the first-speed position. The rotational speed of the output shaft 22 in the first-speed position is represented by a point of intersection between the vertical line Y7 indicative of the rotational speed of the seventh rotary element RE7 fixed to the output shaft 22 and an inclined straight line L1 which passes a point of intersection between the vertical line Y8 indicative of the rotational speed of the eighth rotary element RE8 and the horizontal line X2, and a point of intersection between the vertical line Y6 indicative of the rotational speed of the sixth rotary element RE6 and the horizontal line X1. Similarly, the rotational speed of the output shaft 22 in the second-speed position established by the engaging actions of the first clutch C1 and second brake B2 is represented by a point of intersection between an inclined straight line L2 determined by those engaging actions and the vertical line Y7 indicative of the rotational speed of the seventh rotary element RE7 fixed to the output shaft 22. The rotational speed of the output shaft 22 in the third-speed position established by the engaging actions of the first clutch C1 and first brake B1 is represented by a point of intersection between an inclined straight line L3 determined by those engaging actions and the vertical line Y7 indicative of the rotational speed of the seventh rotary element RE7 fixed to the output shaft 22. The rotational speed of the output shaft 22 in the fourth-speed position established by the engaging actions of the first clutch C1 and second clutch C2 is represented by a point of intersection between a horizontal line L4 determined by those engaging actions and the vertical line Y7 indicative of the rotational speed of the seventh rotary element RE7 fixed to the output shaft 22. In the first-speed through fourth-speed positions in which the switching clutch C0 is placed in the engaged state, the eighth rotary element RE8 is rotated at the same speed as the engine speed $N_E$, with the drive force received from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotational speed of the output shaft 22 in the fifth-speed position established by the engaging actions of the first clutch C1, second clutch C2 and switching brake B0 is represented by a point of intersection between a horizontal line L5 determined by those engaging actions and the vertical line Y7 indicative of the rotational speed of the seventh rotary element RE7 fixed to the output shaft 22.

Figure 6:
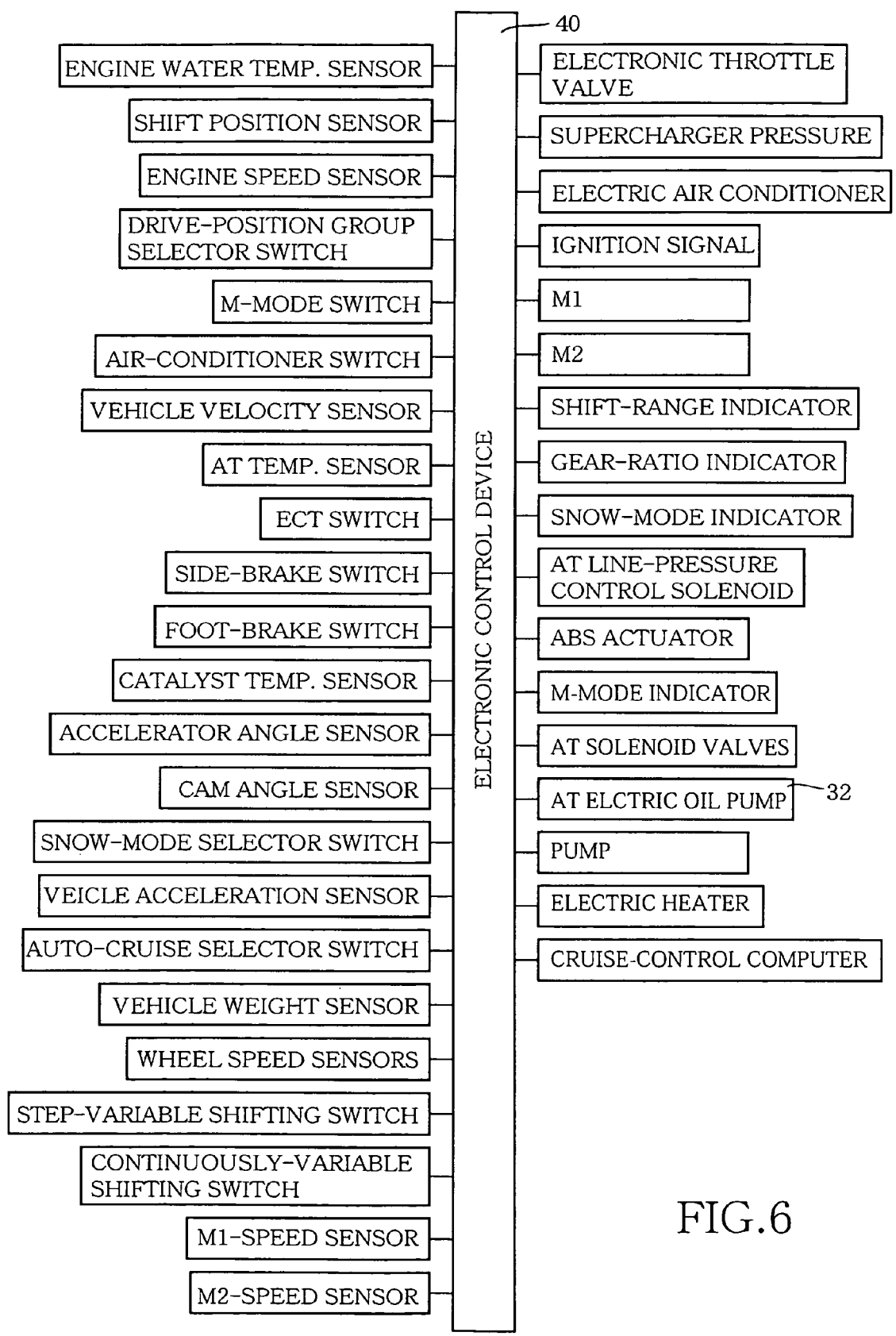
FIG. 6 is a view showing input and output signals of an electronic control device (ECU) as a control apparatus for controlling the vehicle drive apparatus of FIG. 1.

FIG. 6 illustrates signals received by an electronic control unit (ECU) 40 serving as a control apparatus for controlling the drive apparatus which is principally constituted by the transmission mechanism 10, and signals generated by the ECU 40. This ECU 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, electricity generation controls of the electric motors M1 and M2, and drive controls such as shifting controls of the transmission portion 20. It is noted that the ECU 40 as the control apparatus cooperates with the drive apparatus to constitute a vehicle drive system which is constructed according to the preset embodiment of the invention.

The ECU 40 is arranged to receive, from various sensors and switches shown in FIG. 6, various signals such as: a signal indicative of a temperature of cooling water of the engine 8; a signal indicative of a selected operating position of a shift lever; a signal indicative of the operating speed $N_E$ of the engine 8; a signal indicative of a value indicating a selected group of forward-drive positions of the drive system; a signal commanding a M mode (motor drive mode); a signal indicative of an operated state of an air conditioner; a signal indicative of a vehicle running velocity V corresponding to the rotational speed of the output shaft 22; a signal indicative of a temperature of a working oil of the transmission portion 20; a signal indicative of an operated state of a side brake; a signal indicative of an operated state of a foot brake; a signal indicative of a temperature of a catalyst; a signal indicative of an angle $A_{CC}$ of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the respective drive wheels of the vehicle; a signal indicative of an operating state of a step-variable shifting switch provided to place the differential portion 11 or the power distributing mechanism 16 in the fixed-speed-ratio shifting state (non-differential state) in which the transmission mechanism 10 functions as a step-variable transmission; a signal indicative of a continuously-variable shifting switch provided to place the differential portion 11 or the power distributing mechanism 16 in the continuously variable-shifting state in which the transmission mechanism 10 functions as the continuously variable transmission; a signal indicative of a rotational speed $N_{M1}$ of the first electric motor M1; and a signal indicative of a rotational speed $N_{M2}$ of the second electric motor M2.

The ECU 40 is further arranged to generate various signals such as: a signal to drive a throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the differential portion 11 (power distributing mechanism 16) and the transmission portion 20; a signal to operate an electric oil pump 32 used as a hydraulic pressure source for the hydraulic control unit 42; a signal to drive an electric heater; and a signal to be applied to a cruise-control computer.

FIG. 7 is a functional block diagram for explaining major control functions performed by the ECU 40. The ECU 40 includes a step-variable shifting controller 52 operable to effect an automatic shifting control, by determining whether a shifting action should be effected or not in the transmission portion 20, for example, according to a shifting map of FIG. 8 stored in a shifting-map memory 54, on the basis of a condition of the vehicle represented by the vehicle running velocity V and an output torque $T_{OUT}$ of the transmission portion 20. It is noted that shifting boundary lines of the shifting map are represented by solid and one-dot chain lines in FIG. 8.

The ECU 40 further includes a hybrid controller 56 arranged to control the engine 8 to be operated with high efficiency while the transmission mechanism 10 is placed in the continuously-variable shifting state, that is, while the differential portion 11 is placed in the differential state. The hybrid controller 56 is further arranged to control the speed ratio γ0 of the differential portion 11 operating as the electrically controlled continuously variable transmission, so as to establish an optimum proportion of the drive forces produced by the engine 8 and the second electric motor M2, and to optimize a reaction force generated during generation of an electric energy by the first electric motor M1 and/or the second electric motor M2. For instance, the hybrid controller 56 calculates the output as required by the vehicle operator at the present running velocity of the vehicle, on the basis of an operating amount $A_{CC}$ of the accelerator pedal and the vehicle running velocity V, and calculate a required vehicle drive force on the basis of the calculated required output and a required amount of generation of the electric energy. On the basis of the calculated required vehicle drive force, the hybrid controller 56 calculates desired speed $N_E$ and total output of the engine 8, and controls the actual output of the engine 8 and the amount of generation of the electric energy by the first electric motor M1 and/or the second electric motor M2, according to the calculated desired speed and total output of the engine.

The hybrid controller 56 is arranged to effect the above-described hybrid control while taking account of the presently selected gear position of the transmission portion 20, so as to improve the fuel economy of the engine. In the hybrid control, the differential portion 11 is controlled to function as the electrically controlled continuously-variable transmission, for optimum coordination of the engine speed $N_E$ and vehicle running velocity V for efficient operation of the engine 8, and the rotational speed of the power transmitting member 18 determined by the selected gear position of the transmission portion 20. That is, the hybrid controller 56 determines a target value of the overall speed ratio γT of the transmission mechanism 10, so that the engine 8 is operated according a stored highest-fuel-economy curve that satisfies both of the desired operating efficiency and the highest fuel economy of the engine 8. The hybrid controller 56 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid controller 56 supplies the electric energy generated by the first electric motor M1, to an electric-energy storage device 46 and second electric motor M2 through an inverter 44. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 44 to the second electric motor M2, or subsequently consumed by the first electric motor M1. A drive force produced by an operation of the second electric motor M2 or first electric motor M1 with the electric energy is transmitted to the power transmitting member 18. Thus, the drive system is provided with an electric path through which an electric energy generated by conversion of the portion of the drive force of the engine 8 is converted into a mechanical energy. This electric path includes components associated with the generation of the electric energy and the consumption of the generated electric energy by the second electric motor M2. It is also noted that the hybrid controller 56 is further arranged to establish a motor drive mode in which the vehicle is driven with only the electric motor (e.g., second electric motor M2) used as the drive power source, by utilizing the electric CVT function (differential function) of the differential portion 11, irrespective of whether the engine 8 is in the non-operated state or in the idling state. The hybrid controller 56 can establish the motor drive mode by operation of the first electric motor M1 and/or the second electric motor M2, even when the differential portion 11 is placed in the step-variable shifting state (fixed-speed-ratio shifting state) while the engine 8 is in its non-operated state.

Figure 9:
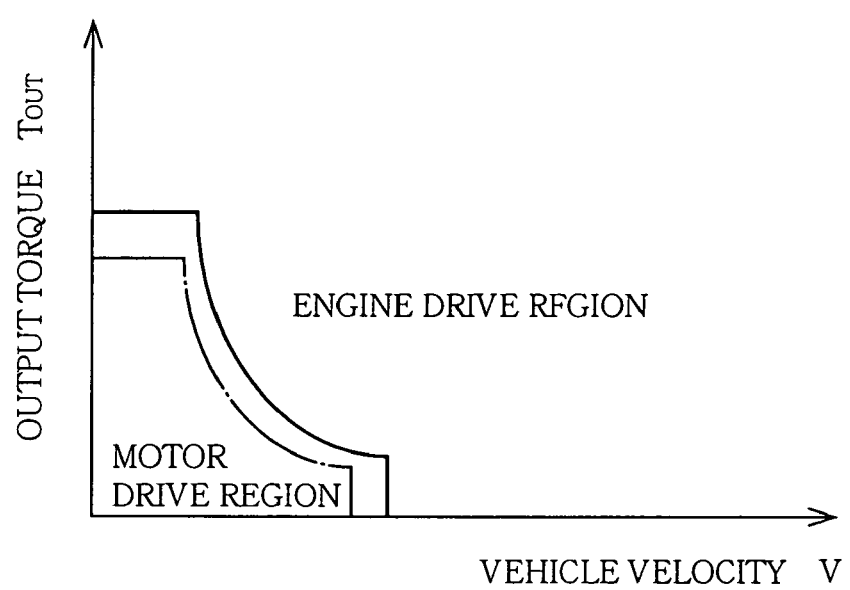
FIG. 9 is a graph showing, in the same two-dimensional coordinate system described above, an example of a stored drive-power-source selection control map used to select an engine drive state and a motor drive state, according to a boundary line defining an engine drive region and a motor drive region.

FIG. 9 shows an example of a stored relationship, namely, a boundary line which defines an engine drive region and a motor drive region and which is used to select the engine 8 or the electric motors M1, M2, as the drive power source (to select one of the engine drive mode and the motor drive mode). That is, the stored relationship is represented by a drive-power-source selection control map (drive-power-source switching boundary line map) in a rectangular two-dimensional coordinate system having an axis along which the vehicle velocity V as a parameter is taken, and an axis along which the drive-force-related value in the form of the output torque $T_{OUT}$ as a parameter is taken. FIG. 9 also shows a one-dot chain line which is located inside the solid boundary line, by a suitable amount of control hysteresis. For example, the drive-power-source selection control map shown in FIG. 9 is stored in the shifting-map memory 54. The hybrid controller 56 determines whether the vehicle condition represented by the vehicle velocity V and the output torque $T_{OUT}$ is in the motor drive region defined by the drive-power-source selection control map. As is apparent from FIG. 9, the hybrid controller 56 selects the motor drive mode when the output torque $T_{OUT}$ is comparatively small, or when the vehicle running velocity V is comparatively low, that is, when the vehicle load is in a comparatively low range in which the operating efficiency of the engine 8 is generally lower than in a comparatively high range.

Figure 10:
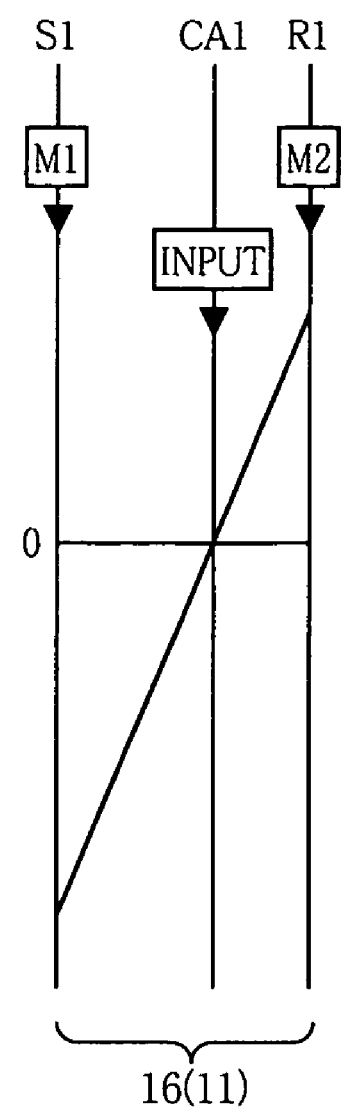
FIG. 10 is a view showing an operating state of the power distributing mechanism (differential portion) switched to its continuously-variable shifting state (differential state), in which the engine rotational speed is substantially zeroed in the motor drive state, and corresponding to a part of the collinear chart of FIG. 3 which part shows the power distributing mechanism.

For reducing a tendency of dragging of the engine 8 held in its non-operated state in the motor drive mode, for thereby improving the fuel economy, the hybrid controller 56 controls the differential portion 11 so that the engine speed $N_E$ is held substantially zero, that is, held zero or close to zero, with the differential function of the differential portion 11. FIG. 10 is a view corresponding to the portion of the collinear chart of FIG. 3 which shows the differential portion 11. The collinear chart of FIG. 10 indicates an example of the operating state of the differential portion 11 placed in its continuously-variable shifting state, in the motor drive mode of the vehicle. Where the vehicle is running with the output torque of the second electric motor M2, the first electric motor M1 is freely rotated in the reverse direction so that the engine speed $N_E$ (rotational speed of the first carrier CA1) is held substantially zero while the second electric motor M2 is operated at a speed corresponding to the vehicle running velocity V.

The ECU 40 further includes a high-speed-gear determiner 58 and a switching device controller 60 which are shown in FIG. 7. The high-speed-gear determiner 58 is arranged to determine whether the gear position to which the transmission mechanism 10 should be shifted is the high-gear position, for example, the fifth-gear position. This determination is made on the basis of the vehicle condition and according to a shifting boundary line map of FIG. 8 stored in the shifting-map memory 54, for example, to determine one of the switching clutch C0 and brake B0 that should be engaged, to place the transmission mechanism 10 in the step-variable shifting state.

Figure 8:
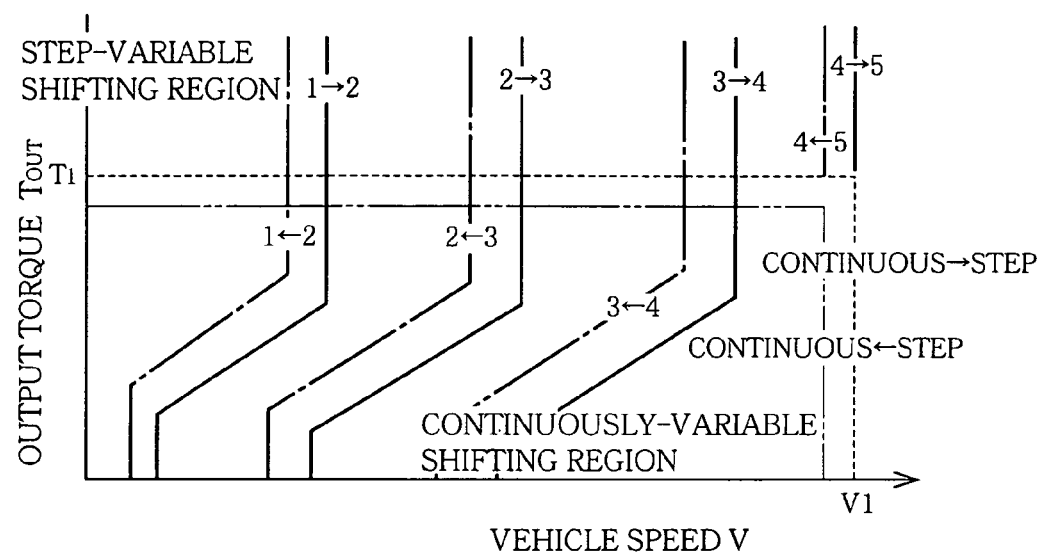
FIG. 8 is a graph showing, in a two-dimensional coordinate system defined by a horizontal axis indicative of a vehicle running velocity V and a vertical axis indicative of an output torque $T_{OUT}$, a complex control map which is a combination of a stored step-variable-shifting control map and a stored switching control map, wherein the step-variable-shifting control map is used for determining a shifting action of an automatic transmission portion while the switching control map is used for determining a shifting state of a transmission mechanism.

The switching device controller 60 is arranged to detect a condition of the hybrid vehicle on the basis of the condition of the vehicle represented by the vehicle running velocity V and the output torque $T_{OUT}$ of the transmission portion 20, and determine, according to the shifting map of FIG. 8 stored in the shifting-map memory 54, whether the detected vehicle condition is in a continuously variable shifting region for placing the transmission mechanism 10 in the continuously-variable shifting state, or in a step-variable shifting region for placing the transmission mechanism 10 in the step-variable shifting state.

When the switching device controller 60 determines that the vehicle condition is in the step-variable shifting region, the switching device controller 60 disables the hybrid controller 56 to effect a hybrid control or continuously-variable shifting control, and enables the step-variable shifting controller 52 to effect a predetermined step-variable shifting control. In this case, the step-variable shifting controller 52 effects an automatic shifting control according to the shifting map of FIG. 8 stored in the shifting-map memory 54. FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the transmission mechanism 10 as a whole consisting of the differential portion 11 and the automatic transmission portion 20 functions as a so-called "step-variable automatic transmission", the gear positions of which are established according to the table of engagement of the frictional coupling devices shown in FIG. 2.

When the high-speed-gear determiner 58 determines that the fifth-gear position should be established as the high-gear position, the switching device controller 60 commands the hydraulic control unit 42 to release the switching clutch C0 and engage the switch brake B0, so that the differential portion 11 functions as an auxiliary transmission having a fixed speed ratio γ0, for example, a speed ratio γ0 of 0.7, whereby the transmission mechanism 10 as a whole is placed in a so-called "overdrive gear position" having a speed ratio lower than 1.0. When the high-speed-gear determiner 58 determines that a gear position other than the fifth-gear position should be established, the switching device controller 60 commands the hydraulic control unit 42 to engage the switching clutch C0 and release the switching brake B0, so that the differential portion 11 functions as an auxiliary transmission having a fixed speed ratio γ0, for example, a speed ratio γ0 of 1, whereby the transmission mechanism 10 as a whole is placed in a low-gear position the speed ratio of which is not lower than 1.0. Thus, the transmission mechanism 10 is switched to the step-variable shifting state, by the switching device controller 60, and the differential portion 11 placed in the step-variable shifting state is selectively placed in one of the two gear positions, so that the differential portion 11 functions as the auxiliary transmission, while at the same time the transmission portion 20 connected in series to the differential portion 11 functions as the step-variable transmission, whereby the transmission mechanism 10 as the whole functions as a so-called "step-variable automatic transmission".

When the switching device controller 60 determines that the vehicle running condition is in the continuously-variable shifting region for placing the transmission mechanism 10 in the continuously-variable shifting state, on the other hand, the switching device controller 60 commands the hydraulic control unit 42 to release the switching clutch C0 and the switching brake B0 for placing the differential portion 11 in the continuously-variable shifting state, so that the transmission mechanism 10 as a whole is placed in the continuously-variable shifting state. At the same time, the switching device controller 60 enables the hybrid controller 56 to effect the hybrid control, and commands the step-variable shifting controller 52 to select and hold a predetermined one of the gear positions, or to permit an automatic shifting control according to the shifting map of FIG. 8 stored in the shifting-map memory 54. In the latter case, the step-variable shifting controller 52 effects the automatic shifting control by suitably selecting the combinations of the operating states of the frictional coupling devices indicated in the table of FIG. 2, except the combinations including the engagement of the switching clutch C0 and brake B0. Thus, the differential portion 11 placed in the continuously-variable shifting state under the control of the switching device controller 60 as the continuously variable transmission while the transmission portion 20 connected in series to the differential portion 11 functions as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotational speed of the power transmitting member 18 is continuously changed, so that the speed ratio of the drive system when the transmission portion 20 is placed in one of those gear positions is continuously variable over a predetermined range. Accordingly, the speed ratio of the automatic transmission portion 20 is continuously variable through the adjacent gear positions, whereby the overall speed ratio γT of the transmission mechanism 10 as a whole is continuously variable. In other words, the switching device controller 60 controls the engaging and releasing actions of the differential-state switching device in the form of the switching brake B0 and switching clutch B0, for selectively placing the power distributing mechanism 16 in one of the differential state and the non-differential state.

The shifting map of FIG. 8 is stored in the shifting-map memory 54, so as to be used to determine whether a shifting action of the transmission portion 20 should be effected. This shifting map is an example of a shifting map representative of a relationship between two parameters, i.e., the vehicle running velocity V and the output torque $T_{OUT}$ as the drive-force-related value which are taken along respective two axes of a rectangular two-dimensional coordinate system. The solid line in FIG. 8 is a shift-up boundary line, while the one-dot chain line is a shift-down boundary line. A broken line shown in FIG. 8 indicates an upper vehicle-velocity limit. V1 and an upper output-torque limit T1 which are used to determine whether the vehicle condition is in the step-variable shifting region or the continuously-variable shifting region. That is, the broke line in FIG. 8 is a predetermined upper vehicle-velocity limit line consisting of a series of upper velocity limits V1 for determining whether the hybrid vehicle is in the high-speed running state or not, and also a predetermined upper output limit line consisting of a series of upper output limits in the form of upper limits T1 of the output torque $T_{OUT}$ of the transmission portion 20 as the drive-force-related value for determining whether the hybrid vehicle is in the high-output running state or not. A two-dot chain line also shown in FIG. 8 is a limit line which is offset with respect the broken line, by a suitable amount of control hysteresis, so that the broken line and the two-dot chain line are selectively used as the boundary line defining the step-variable shifting region and the continuously-variable shifting region. The shifting map of FIG. 8 is a stored switching boundary line map (switching map or relationship) each of which includes the upper vehicle-velocity limit V1 and the upper output torque limit T1 and is used by the switching device controller 60 to determine whether the vehicle condition is in the step-variable shifting region or continuously-variable shifting region, on the basis of the vehicle velocity V and the output torque $T_{OUT}$. This switching boundary line map may be included in the shifting boundary line map stored in the shifting-map memory 54. The switching boundary line map may include at least one of the upper vehicle-velocity limit V1 and the upper output-torque limit T1, and may use only one of the vehicle velocity V and the output torque $T_{OUT}$ as a control parameter. The shifting boundary line map and switching boundary line map described above may be replaced by expressions for comparison of the actual value of the vehicle velocity V with the upper vehicle-velocity limit V1, and expressions for comparison of the actual value of the output torque $T_{OUT}$ with the upper output-torque limit T1.

The above-described drive-force-related value is a parameter directly corresponding to the vehicle drive force, and may be represented by not only a drive torque or force of the drive wheels 38, but also the output torque $T_{OUT}$ of the transmission portion 20, engine torque $T_E$ or vehicle acceleration value, or an actual value of the engine torque $T_E$ which is calculated from the engine speed $N_E$ and an angle of operation of an accelerator pedal or an angle of opening of a throttle valve (intake air quantity, air/fuel ratio or amount of fuel injection), or an estimated value of an operator's required vehicle drive force calculated from an amount of operation of the accelerator pedal or angle of opening of the throttle valve. The above-described drive torque may be calculated on the basis of the output torque $T_{OUT}$ and by taking account of the gear ratio of the differential gear device, the radius of the drive wheels 38 or the like, or directly detected by a torque sensor. Each of the other torques also may be calculated on the basis of a value related to the torque, or directly detected by a torque sensor.

The upper vehicle-velocity limit V1 is determined so that the transmission mechanism 10 is placed in the step-variable shifting state while the vehicle velocity V is higher than the upper limit V1. This determination is effective to minimize a possibility of deterioration of the fuel economy of the vehicle if the transmission mechanism 10 were placed in the continuously-variable shifting state at a relatively high running velocity of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 11:
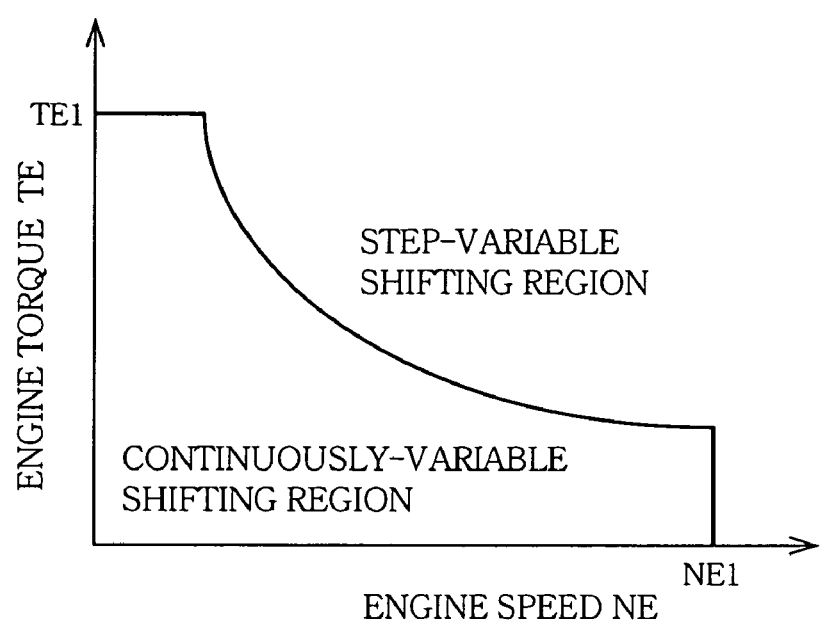
FIG. 11 is a graph showing a stored map which has a boundary line defining a continuously-variable shifting region and a step-variable shifting region, and which is used to establish boundary line represented by broken line in the map of FIG. 8.

FIG. 11 shows a switching boundary line map (switching map or relationship) which is stored in the shifting-map memory 54 and which has a switching boundary line in the form of an engine output line defining a step-variable shifting region and a continuously-variable shifting region one of which is selected by the switching device controller 60 on the basis of parameters consisting of the engine speed $N_E$ and engine torque $T_E$. The switching device controller 60 may use this switching boundary line map of FIG. 11 in place of the switching boundary line map of FIG. 8, to determine whether the vehicle condition represented by the engine speed $N_E$ and engine torque $T_E$ is in the continuously-variable shifting region or in the step-variable shifting region. The broken lines in FIG. 8 can be generated on the basis of the switching boundary line map of FIG. 11. In other words, the broken lines of FIG. 8 are switching boundary lines which are defined on the basis of the relationship (map) of FIG. 11, in the rectangular two-dimensional coordinate system having parameters consisting of the vehicle running velocity V and the output torque $T_{OUT}$.

As shown in FIG. 8, the step-variable shifting region is set to be a high output-torque region in which the output torque $T_{OUT}$ is not lower than the upper output-torque limit T1, and a high vehicle-speed region in which the vehicle running velocity V is not lower than the upper vehicle-velocity limit V1. Accordingly, the step-variable shifting control is effected when the vehicle is in a high-output running state with a comparatively high output of the engine 8 or when the vehicle is in a high-speed running state, while the continuously-variable shifting control is effected when the vehicle is in a low-output running state with a comparatively low output of the engine 8 or when the vehicle is in a low-speed running state, that is, when the engine 8 is in a normal output state. Similarly, the step-variable shifting region indicated in FIG. 11 is set to be a high-torque region in which the engine output torque $T_E$ is not lower than a predetermined value $T_{E1}$, a high-speed region in which the engine speed $N_E$ is not lower than a predetermined value $N_{E1}$, or a high-output region in which the engine output determined by the output torque $T_E$ and speed $N_E$ of the engine 8 is not lower than a predetermined value. Accordingly, the step-variable shifting control is effected when the torque, speed or output of the engine 8 is comparatively high, while the continuously-variable shifting control is effected when the torque, speed or output of the engine is comparatively low, that is, when the engine is in a normal output state. The switching boundary line in FIG. 11, which defines the step-variable shifting region and the continuously-variable shifting region, function as an upper vehicle-velocity limit line consisting of a series of upper vehicle-velocity limits, and an upper output limit line consisting of a series of upper output limits.

Figure 12:
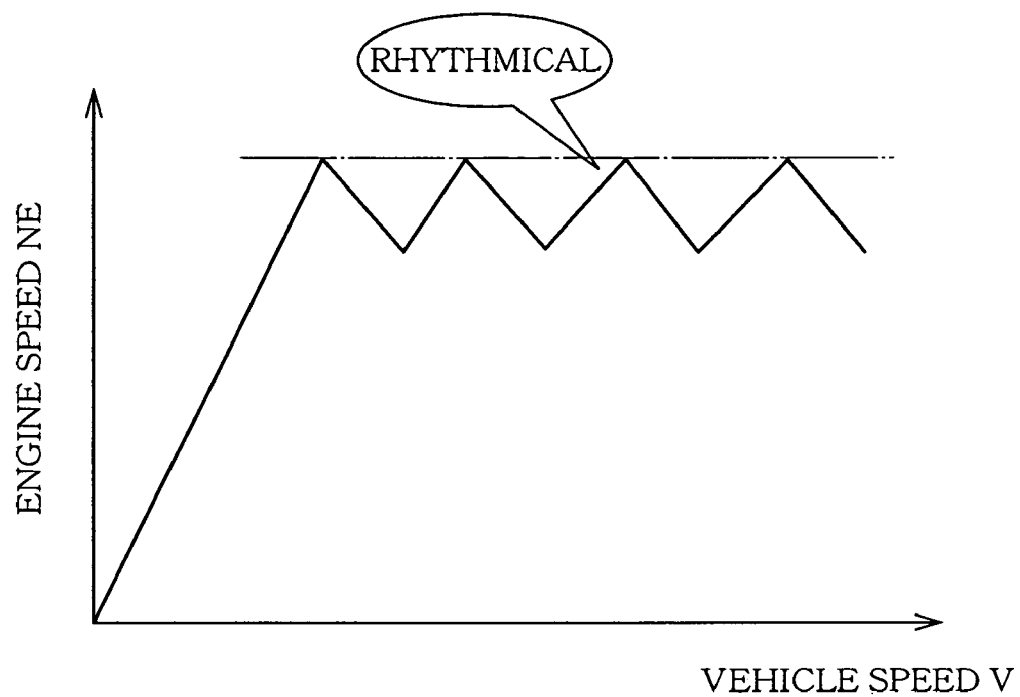
FIG. 12 is a graph showing an example of a change of the engine rotational speed caused as a result of ship-up actions of the transmission mechanism when placed in the step-variable shifting state.

Therefore, when the vehicle is in a low- or medium-velocity running state or in a low- or medium-output running state, the transmission mechanism 10 is placed in the continuously-variable shifting state, assuring a high degree of fuel economy of the vehicle. When the vehicle is in a high-velocity running state with the vehicle velocity V exceeding the upper vehicle-velocity limit V1, on the other hand, the transmission mechanism 10 is placed in the step-variable shifting in which the transmission mechanism 10 is operated as a step-variable transmission, and the output of the engine 8 is transmitted to the drive wheels 38 primarily through the mechanical power transmitting path, so that the fuel economy is improved owing to reduction of a loss of conversion of the mechanical energy into the electric energy, which would take place when the transmission mechanism 10 is operated as an electrically controlled continuously variable transmission. When the vehicle is in a high-output running state in which the drive-force-related value in the form of the output torque $T_{OUT}$ exceeds the upper output-torque limit T1, the transmission mechanism 10 is also placed in the step-variable shifting state. Therefore, the transmission mechanism 10 is placed in the continuously-variable shifting state or operated as the electrically controlled continuously variable transmission, only when the vehicle running velocity V is relatively low or medium or when the engine output is relatively low or medium, so that the required amount of electric energy generated by the first electric motor M1, that is, the maximum amount of electric energy that must be transmitted from the first electric motor M1 can be reduced, thereby making it possible to minimize the required size of the first electric motor M1, and the required size of the drive apparatus including the electric motor M1. In other words, the transmission mechanism 10 is switched from the continuously-variable shifting state to the step-variable shifting state (fixed-speed-ratio shifting state) in the high-output running state of the vehicle in which the vehicle operator desires an increase of the vehicle drive force, rather than an improvement in the fuel economy. Accordingly, the vehicle operator is satisfied with a change of the engine speed $N_E$ as a result of a shift-up action of the automatic transmission portion 20 in the step-variable shifting state, that is, a comfortable rhythmic change of the engine speed $N_E$, as indicated in FIG. 12.

Figure 13:
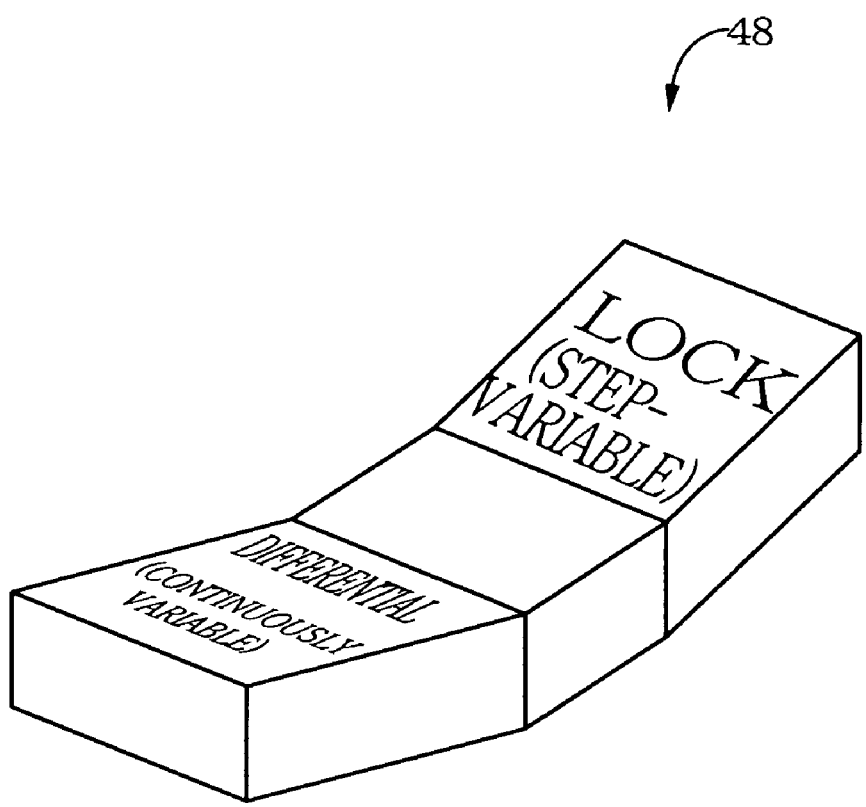
FIG. 13 is a view showing an example of a shifting-state selecting device manually operable by the user to select the shifting state, in the form of a seesaw switch functioning as a selector switch.

FIG. 13 shows a seesaw switch 48 functioning as a manually shifting-state selecting device manually operable by the user to selectively place the power distributing mechanism 16 in its differential state or non-differential state, namely, place the transmission mechanism 10 in its continuously-variable shifting state or step-variable shifting state. That is, one of the continuously-variable shifting state or step-variable shifting state, which is desired by the user himself, is established by the manual operation of the switch 48 by the user. The switch 48 has a portion labeled "DIFFERENTIAL" corresponding to the continuously-variable shifting state, and a portion labeled "LOCK" corresponding to the step-variable shifting state. When the user presses the portion labeled "DIFFERENTIAL", the power distributing mechanism 16 is placed in its differential state, whereby the transmission mechanism 10 is placed in its continuously-variable shifting state in which the transmission mechanism 10 functions as the electrically controlled continuously variable transmission. When the user presses the portion labeled "LOCK", the power distributing mechanism 16 is placed in its non-differential state, whereby the transmission mechanism 10 is placed in its step-variable shifting state in which the transmission mechanism 10 functions as the step-variable transmission. For instance, the user of the vehicle manually operates the switch 48 to place the transmission mechanism 10 in the continuously-variable shifting state when the user likes the transmission mechanism 10 to operate as the continuously variable transmission or wants to improve the fuel economy of the engine, or alternatively in the step-variable shifting state when the user likes a change of the engine speed as a result of a shifting action of the transmission mechanism 10 operating as the step-variable transmission.

There will be described in detail the operation of the switching device controller 60 in the motor drive mode in which only the electric motor, for example, only the second electric motor M2 is operated as the drive power source, owing to the electric CVT function (differential function) of the differential portion 11. When it is determined that the vehicle condition is in the motor drive region, the switching device controller 60 places the power distributing mechanism 16 in its differential state, such that the engine speed $N_E$ can be held substantially zero, as indicated in FIG. 10, under the control of the hybrid controller 56, for reducing a tendency of dragging of the engine 8 held in its non-operated state in the motor drive mode, for thereby improving the fuel economy.

In the motor drive mode, the switching device controller 60 places the power distributing mechanism 16 in its differential state, even when the step-variable shifting state or non-differential state of the power distributing mechanism 16 is selected by the switch 48. As is apparent from the drive-power-source selection control map of FIG. 9, the vehicle running in the motor drive mode is in a low-load state, in which a comfortable change of the engine speed that would be obtained in a high-torque running state cannot be obtained as a result of a shifting action of the automatic transmission, and in which the vehicle operator does not expect such a comfortable change of the engine speed. In the motor drive mode, therefore, the switching device controller 60 places the power distributing mechanism 16 in the differential state, for improving the fuel economy, even when the non-differential state is selected by the switch 48.

If there is a high possibility of starting of the engine in the motor drive mode, the switching device controller 60 places the power distributing mechanism 16 in the non-differential state even in the motor drive mode, for raising the engine speed $N_E$ to facilitate the ignition of the engine. Since the engine speed $N_E$ is held substantially zero in the motor drive mode, as described above, the switching device controller 60 places the power distributing mechanism 16 in the non-differential state, by engaging the switching brake B0 or switching clutch C0, for raising the rotational speed of the first sun gear S1 to raise the engine speed $N_E$ at a higher rate than a rate of increase of the first sun gear S1 by the first electric motor M1 in the differential state of the power distributing mechanism 16.

Figure 14:
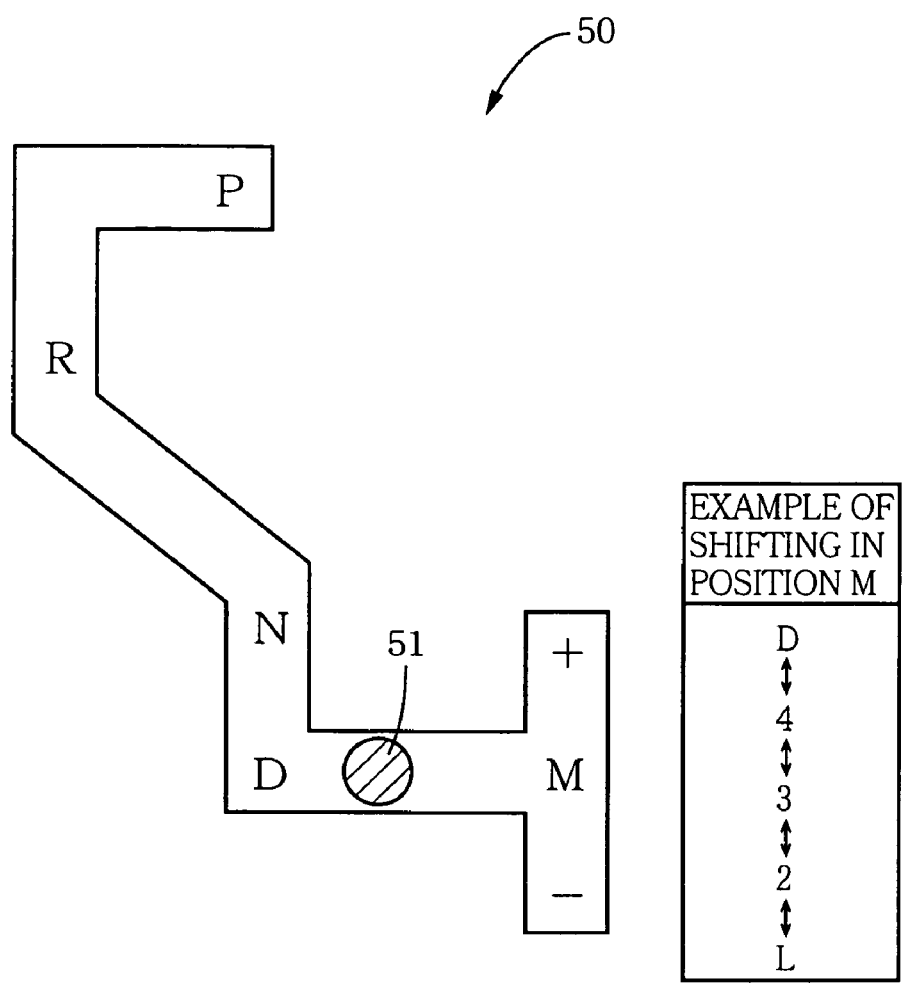
FIG. 14 is a view showing an example of a manually operable shifting device which includes a shift lever and which is used to select a plurality of operating positions.

FIG. 14 shows an example of a manually operable shifting device in the form of a shifting device 50 including a shift lever 51, which is disposed laterally adjacent to an operator's seat, for example, and which is manually operated to select one of a plurality of gear positions consisting of a parking position P for placing the transmission mechanism 10 (namely, transmission portion 20) in a neutral state in which a power transmitting path is disconnected with both of the switching clutch C0 and brake B0 placed in the released state, while at the same time the output shaft 22 of the transmission portion 20 is in the locked state; a reverse-drive position R for driving the vehicle in the rearward direction; a neutral position N for placing the transmission mechanism 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 51 is operated to the manual forward-drive shifting position M, for manually selecting one of five shift ranges "D", "4", "3", "2" and "L". Described in detail, the shift lever 51 is movable from the manual forward-drive shifting position M to a shift-up position "+" and a shift-down position "−", which are spaced from each other in the longitudinal direction of the vehicle. Each time the shift lever 51 is moved to the shift-up position or the shift-down position "−", the presently selected shift range is changed by one range. The five shift ranges "D" through "L" have respective different lower limits of a range in which the overall speed ratio γT of the transmission mechanism 10 is automatically variable, namely, have respective different lowest values of the overall speed ratio γT which corresponds to the highest output speed of the transmission mechanism 10. That is, the five shift ranges "D" through "L" select respective different numbers of the speed positions or gear positions of the transmission portion 20 which are automatically selectable, so that the lowest overall speed ratio γT available is dependent upon the selected shift range. The shift lever 51 is biased by biasing means such as a spring so that the shift lever 51 is automatically returned from the shift-up position "+" and shift-down position "−" back to the manual forward-drive shifting position M. The shifting device 50 is provided with a shift-position sensor operable to detect the presently selected position of the shift lever 51, so that signals indicative of the presently selected operating position of the shift lever 51 and the number of shifting operations of the shift lever 51 in the manual forward-shifting position M are outputted to the ECU 40.

When the shift lever 51 is operated to the automatic forward-drive shifting position D, the switching device controller 60 effects an automatic switching control of the transmission mechanism 10 according to the stored switching map indicated in FIG. 8, and the hybrid controller 56 effects the continuously-variable shifting control of the power distributing mechanism 16, while the step-variable shifting controller 52 effects an automatic shifting control of the transmission portion 20. When the transmission mechanism 10 is placed in the step-variable shifting state, for example, the shifting action of the transmission mechanism 10 is automatically controlled to select an appropriate one of the first-gear position through the fifth-gear position indicated in FIG. 2. When the transmission mechanism 10 is placed in the continuously-variable shifting state, the speed ratio of the power distributing mechanism 16 is continuously changed, while the shifting action of the transmission portion 20 is automatically controlled to select an appropriate one of the first-gear through fourth-gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 51 is operated to the manual forward-drive shifting position M, on the other hand, the shifting action of the transmission mechanism 10 is automatically controlled by the step-variable shifting controller 52, hybrid controller 56 and switching device controller 60, such that the overall speed ratio γT is variable within a predetermined range the lower limit of which is determined by the gear position having the lowest speed ratio, which gear position is determined by the manually selected one of the shift ranges "D" through "L". When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the transmission portion 20 is automatically controlled to select an appropriate one of the gear positions the number of which is determined by the manually selected one of the shift ranges "D" through "L", so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

The ECU 40 still further includes a power-transmitting-path disconnection determiner 62, a generation request determiner 64, a generation controller 66 and a pump controller 68 which are shown in FIG. 7. The power-transmitting-path disconnection determiner 62 is arranged to determine whether or not the transmission portion 20 is placed in its power-transmission disconnecting state, namely, whether or not the above-described power transmitting path is disconnected in the transmission mechanism 10 or in the transmission portion 20. This determination is made, for example, on the basis of the signal supplied from the shift-position sensor and indicative of the presently selected operating position of the shift lever 51. In this determination, an affirmative decision (YES) is obtained when the neutral position N or parking position P is selected in the shifting device 50.

The generation request determiner 64 is arranged to determine whether generation of an electric energy by the first electric motor M1 and/or second electric motor M2 serving as generators is requested or not, for example, on the basis of an amount of the electric energy remaining in the electric-energy storage device 46. In this determination, an affirmative decision (YES) is obtained when the remaining amount of the electric energy is not larger than a predetermined threshold, while a negative decision (NO) is obtained when the remaining amount is larger than the predetermined threshold.

The generation controller 66 is arranged to operated, when the affirmative decision is obtained in the determination made by the generation request determiner 64, namely, when the generation of the electric energy by the first electric motor M1 and/or second electric motor M2 is requested, so as to generate the electric energy by controlling activation of the first electric motor M1 and/or second electric motor M2 through the hybrid controller 56, so that the electric-energy storage device 46 is charged with the generated electric energy.

When the generation of the electric energy is intended with the transmission portion 20 being placed in its power-transmission disconnecting state, namely, when the affirmative decision is obtained in the determination made by the power-transmitting-path disconnection determiner 62 as well as in the determination made by the generation request determiner 64, the switching device controller 60 causes the power distributing mechanism 16 to be placed in its differential state. That is, the differential-state switching device in the form of the switching brake B0 and switching clutch C0 is controlled through the hydraulic control unit 42 by the switching device controller 60, such that the power distributing mechanism 16 is placed in its differential state in which the first carrier CA1 as the first element, the first sun gear S1 as the second element and the first ring gear R1 as the third element are rotatable at respective speeds different from each other. It is preferable that the switching device controller 60 places the power distributing mechanism 16 in the differential state during the electricity generation with the transmission portion 20 being placed in its power-transmission disconnecting state, even when the step-variable shifting position (non-differential state) is selected by the switch 48.

Figure 15:
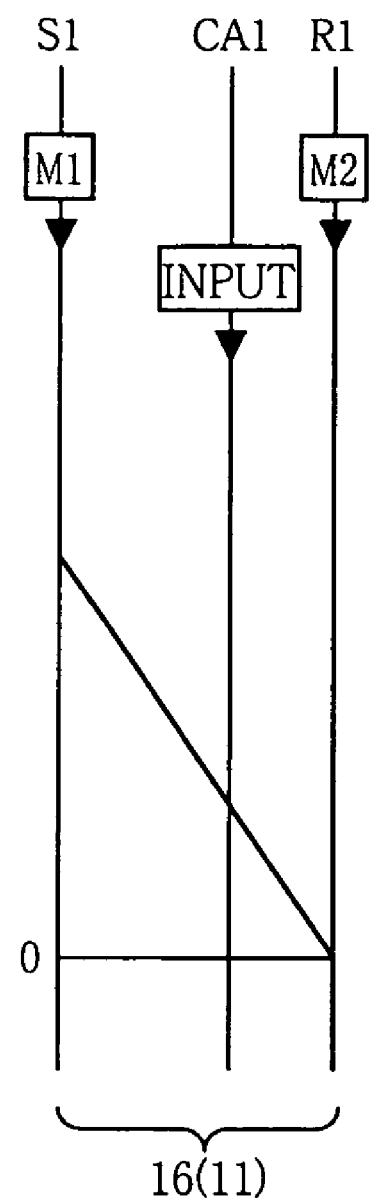
FIG. 15 is a view showing an operating state of the power distributing mechanism (differential portion) switched to its continuously-variable shifting state (differential state), in which the rotational speed of the first ring gear R1 is substantially zeroed during an electricity generation performed with the transmission mechanism being placed in its non-driving position.

FIG. 15 shows an example of an operating state of the differential portion 11 placed in the continuously-variable shifting state (differential state) with the switching clutch C0 and the switching brake B0 both held in the released state. In a conventional vehicle in which its transmission mechanism does not include the transmission mechanism 20 and is constituted exclusively by the differential portion 11 having the electric CVT function, when the generation of the electric energy is intended with the transmission mechanism 20 placed in its non-driving position such as a neutral position, the rotational speed of the power transmitting member 18 has to be substantially zeroed. To this end, while the vehicle is held stationary, the rotational speed of the first sun gear S1 as the second element, i.e., the rotational speed of the first electric motor M1 is increased to such a value that causes the rotational speed of the first ring gear R1 as the third element connected to the power transmitting member 18 to be held substantially zeroed, as shown in FIG. 15. Thus, the rotational speed of the first electric motor M1 is determined to be a unique value dependent upon the vehicle running condition, while the rotational speed of the second electric motor M2 is substantially zeroed.

Figure 16:
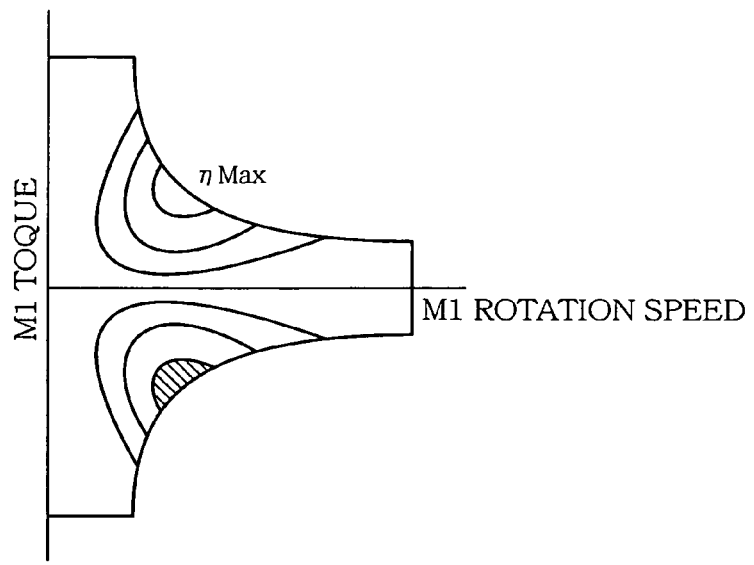
FIGS. 16 and 17 are graphs indicating iso-efficiency curves of first end second electric motors M1, M2, respectively, by way of examples.
Figure 17:
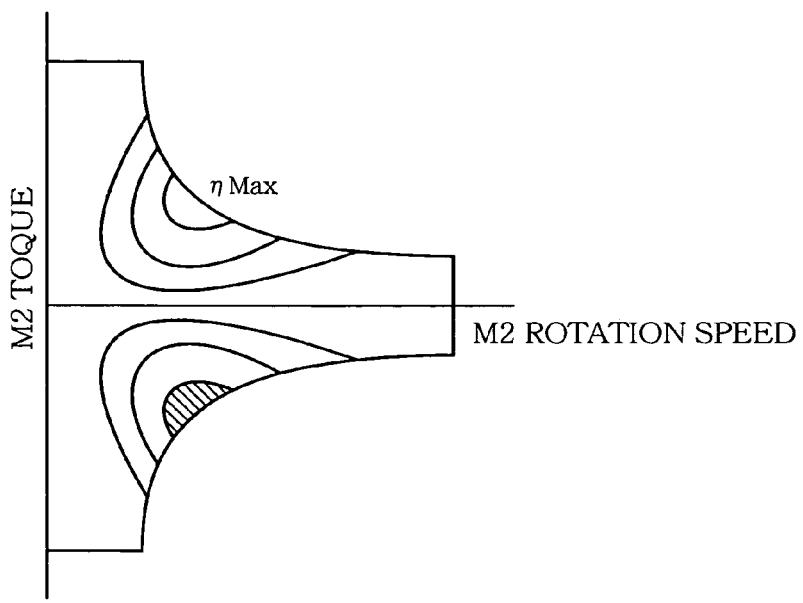

FIGS. 16 and 17 are graphs indicating iso-efficiency curves of the first end second electric motors M1, M2, respectively, by way of examples. In each of FIGS. 16 and 17, an efficiency of the electric motor as the drive power source for outputting the vehicle drive force is shown on an upper side of the horizontal axis of the graph, while an efficiency of the electric motor as the generator for generating the reaction force is shown on a lower side of the horizontal axis of the graph. In each of the electric motors M1, M2, the generation efficiency is maximized when a combination of values of the respective torque and rotational speed lies in a maximized region represented by oblique lines, in which region a relatively large electric energy can be generated with a relatively low rotational speed of the electric motor. The generation efficiency of the electric motor is reduced with an increase in a distance between the maximized region and the combination of the actual values of the respective torque and rotational speed. That is, the generation efficiency of each of the electric motors M1, M2 as the generator is dependent upon an operating point which is defined by the torque and rotational speed of the electric motor. In the drive apparatus or system constructed according to the present embodiment of the invention, during the generation of the electric energy with the transmission portion 20 placed in its power-transmission disconnecting state, the power distributing mechanism 16 is placed in its differential state under the control of the switching device controller 60, so that the first carrier CA1 as the first element, the first sun gear S1 as the second element and the first ring gear R1 as the third element are rotatable at respective speeds different from each other, whereby the operating points of the first and second electric motors M1, M2 can be freely determined.

When the generation of the electric energy is intended with the transmission portion 20 being placed in its power-transmission disconnecting state, namely, when the affirmative decision is obtained in the determination made by the power-transmitting-path disconnection determiner 62 as well as in the determination made by the generation request determiner 64, the generation controller 66 controls the first and second electric motors M1, M2, such that the first and second electric motors M1, M2 are operated at respective operating points different from each other, namely, such that the electric energy is generated by rotations of the respective first and second electric motors M1, M2 with at least one of the rotational speed and torque of one of the first and second electric motors M1, M2 being different from that of the other of the first and second electric motors M1, M2. It is preferable that the first and second electric motors M1, M2 are controlled by the generation controller 66, such that a total generation efficiency of the first and second electric motors M1, M2, i.e., the electric energy generated by the first and second electric motors M1, M2 is maximized.

The pump controller 68 is arranged to control activation of the electric oil pump 32, for controlling the pressure of the pressurized working fluid supplied from the pump 32. When the generation of the electric energy is intended with the transmission portion 20 being placed in its power-transmission disconnecting state, namely, when the affirmative decision is obtained in the determination made by the power-transmitting-path disconnection determiner 62 as well as in the determination made by the generation request determiner 64, the pump 32 is controlled by the pump controller 68 such that a pressure of the working fluid is lowered to substantially zero, or such that the pressure of the working fluid is made lower than when a negative decision is obtained in the determination made by the power-transmitting-path disconnection determiner 62 and/or in the determination made by the generation request determiner 64. This is because the pressure of the working fluid delivered to each of the hydraulically operated frictional coupling devices may be reduced or substantially zeroed when the transmission mechanism 10 is placed in its non-driving position such as the neutral position, namely, when the hydraulically operated frictional coupling devices are all released as shown in FIG. 2.

Figure 18:
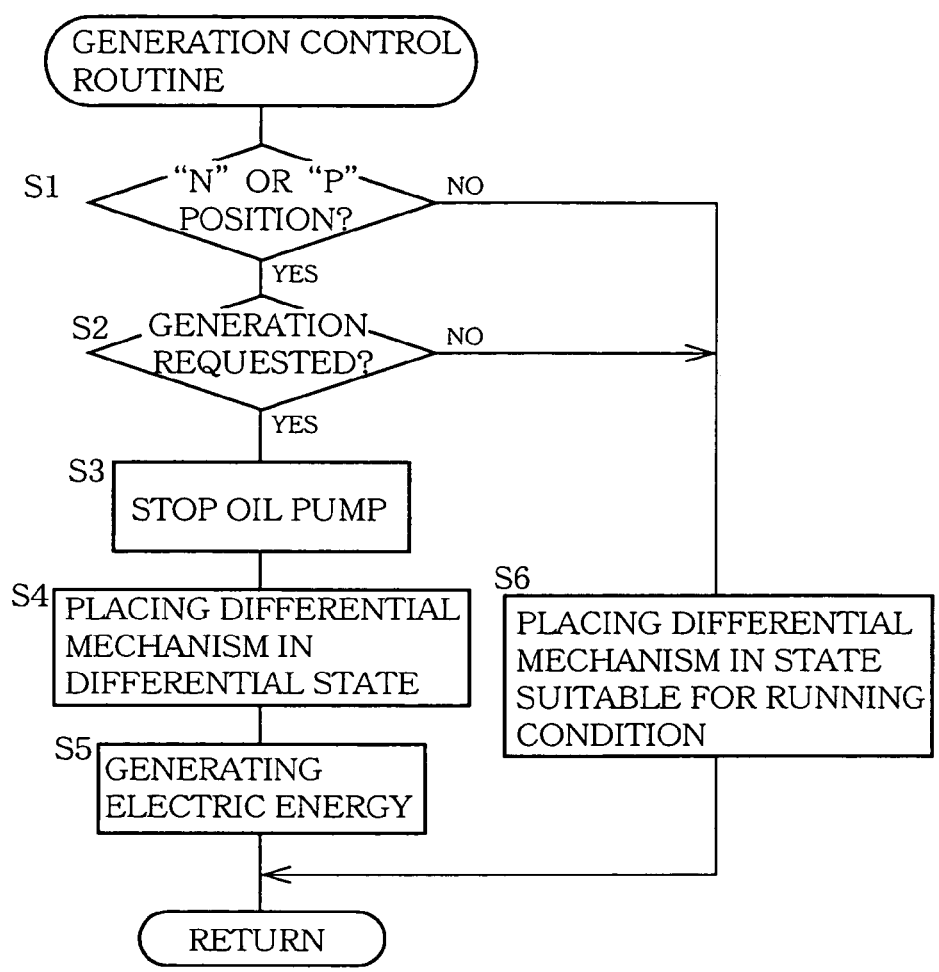
FIG. 18 is a flow chart illustrating an electricity generation control routine which is executed by the ECU of FIG. 6.

FIG. 18 is a flow chart illustrating an electricity generation control routine which is executed by the ECU 40, to control the first and second electric motors M1, M2 for generating an electric energy. This control routine is repeatedly executed with an extremely short cycle time of about several milliseconds to several tens of milliseconds, for example.

The routine is initiated with step S1 which is implemented by the power-transmitting-path disconnection determiner 62, to determine, on the basis of the signal supplied from the shift-position sensor and indicative of the currently selected operating position of the shift lever 51, whether or not the transmission portion 20 is placed in its power-transmission disconnecting state, namely, whether or not the above-described power transmitting path is disconnected in the transmission mechanism 10. If a negative decision (NO) is obtained in step S1, the control flow goes to step S6 that is implemented by the switching device controller 60 to place the power distributing mechanism 16 as the differential mechanism in one of its differential state and non-differential state, which one is suitable for the current running condition of the vehicle. After the implementation of step S6, one cycle of execution of the control routine is terminated.

If an affirmative decision (YES) is obtained in step S1, step S2 is implemented by the generation request determiner 64 to determine whether generation of an electric energy by the first electric motor M1 and/or second electric motor M2 serving as the generators is requested or not, on the basis of the amount of the electric energy remaining in the electric-energy storage device 46. In this determination, an affirmative decision (YES) is obtained when the remaining amount of the electric energy is not larger than a predetermined threshold. If a negative decision (NO) is obtained, one cycle of execution of the control routine is terminated after the implementation of step S6. If the affirmative decision is obtained, step S3 is implemented by the pump controller 68 to control activation of the electric oil pump 32 such that the pressure of the working fluid supplied by the pump 32 is reduced or substantially zeroed. Step S3 is followed by step S4 which is implemented by the switching device controller 60 to control the hydraulic control unit 42 such that the switching brake B0 and switching clutch C0 each serving as the differential-state switching device are placed in their released states, whereby the distributing mechanism 16 is placed in its differential state in which the first carrier CA1 as the first element, the first sun gear S1 as the second element and the first ring gear R1 as the third element are rotatable at respective speeds different from each other. Step S4 is followed by step S5 which is implemented by the generation controller 66 to control the first and second electric motors M1, M2, such that the first and second electric motors M1, M2 are operated at respective operating points different from each other, preferably, such that the total generation efficiency of the first and second electric motors M1, M2, i.e., the electric energy generated by the first and second electric motors M1, M2 is maximized.

As described above, the vehicle drive system constructed according to the present embodiment is constituted by the vehicle drive apparatus and the control apparatus which controls the drive apparatus. The drive apparatus is principally constituted by the transmission mechanism 10 including: the power transmitting member 18; the power distributing mechanism 16 which has the first element connected to the engine 8, the second element connected to the first electric motor M1, and the third element connected to the second electric motor M2 and the power transmitting member 18; the automatic transmission portion 20 disposed between the power transmitting member 18 and the drive wheels 38; and the switching brake B0 and clutch C0 as the differential-state switching device operable to selectively place the power distributing mechanism 16 in its differential state in which the first through third elements are rotatable at respective speeds different from each other, and in its non-differential state in which the first through third elements are rotated as a unit or in which the second element is not rotatable. Meanwhile, the ECU 40 as the control apparatus includes the switching device controller 60 which is arranged to implement steps S4 and S6 of the above-described electricity generation control routine. During the generation of the electric energy while the power transmitting path is being disconnected, namely, while the transmission portion 20 is placed in its non-driving position, the switching device controller 60 causes the switching brake B0 and clutch C0 as the differential-state switching device to place the power distributing mechanism 16 in its differential state. The placement of the power distributing mechanism 16 in its differential state provides a higher degree of freedom in determining the rotational speeds of the first and second electric motors M1, M2 which are connected to the second and third elements, respectively, thereby allowing the first and second electric motors M1, M2 to be operated at preferable operating points. That is, the present vehicle drive system is capable of maximizing an efficiency of an electricity generation when performed with the power transmitting path being disconnected, in the vehicle equipped with the power distributing mechanism 16 serving as a speed variable transmission owing to its differential action.

Further, in the vehicle drive system, the generation controller 66 (S5) is provided to control the first and second electric motors M1, M2 during the generation of the electric energy while the power transmitting path is being disconnected, such that the first and second electric motors M1, M2 are operated at respective operating points different from each other, thereby enabling the first and second electric motors M1, M2 to be operated at further preferable operating points.

Further, the generation controller 66 is arranged to control the first and second electric motors M1, M2 during the generation of the electric energy, such that the overall generation efficiency of the first and second electric motors M1, M2 is maximized, thereby enabling the first and second electric motors M1, M2 to be operated at optimum operating points. However, a limitation may be imposed on the rotational speed of the second electric motor M2 in case the transmission mechanism 10 is manually switched from its non-driving position such as the neutral position N, to the forward-drive shifting position D or reverse-drive position R.

Further, in the vehicle drive system, the pump controller 68 (S3) is provided to control the electric oil pump 32 such that the pressure of the working fluid supplied from the pump 32 to the transmission portion 20 is reduced or substantially zeroed during the generation of the electric energy while the power transmitting path is being disconnected. This arrangement is effective to reduce the electric energy consumed by activation of the pump 32 and improve a fuel economy of the vehicle.

Further, in the vehicle drive system, the power distributing mechanism 16 is provided by the switchable transmission which is principally constituted by the first planetary gear set 24 and which is switchable between its step-variable shifting state as the non-differential state in which the differential mechanism functions as the step variable transmission, and its continuously-variable shifting state as the differential state in which the differential mechanism functions as the continuously variable transmission permitting a ratio between the rotational speeds of the respective second and third elements RE2, RE3 to be continuously variable. During the generation of the electric energy while the power transmitting path is being disconnected, the switching device controller 60 causes the switching brake B0 and clutch C0 as the differential-state switching device to place the power distributing mechanism 16 in its continuously-variable shifting state. In this arrangement, since the ratio between the rotational speeds of the respective second and third elements RE2, RE3 is continuously variable, the rotational speeds of the respective first and second electric motors M1, M2 connected to the respective second and third elements RE2, RE3 can be freely determined, whereby the operations of the first and second electric motors M1, M2 at desired operating points are facilitated.

Figures 19, 20:
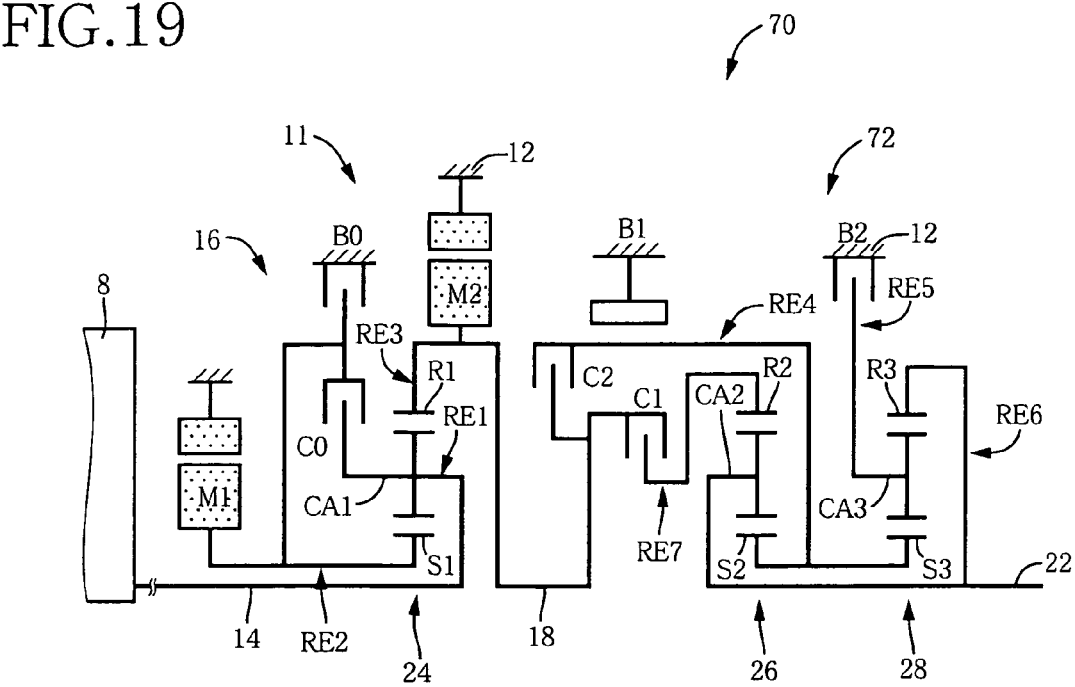
FIG. 19 is a schematic view illustrating a basic arrangement of a drive apparatus incorporated in a hybrid vehicle drive system which is constructed according to another embodiment of the present invention.
FIG. 20 is a table indicating shifting actions of the drive apparatus of FIG. 19 operable in a continuously variable shifting state or a step-variable shifting state, in relation to different combinations of operating states of hydraulically operated frictional coupling devices to effect the respective shifting actions.
Figure 21:
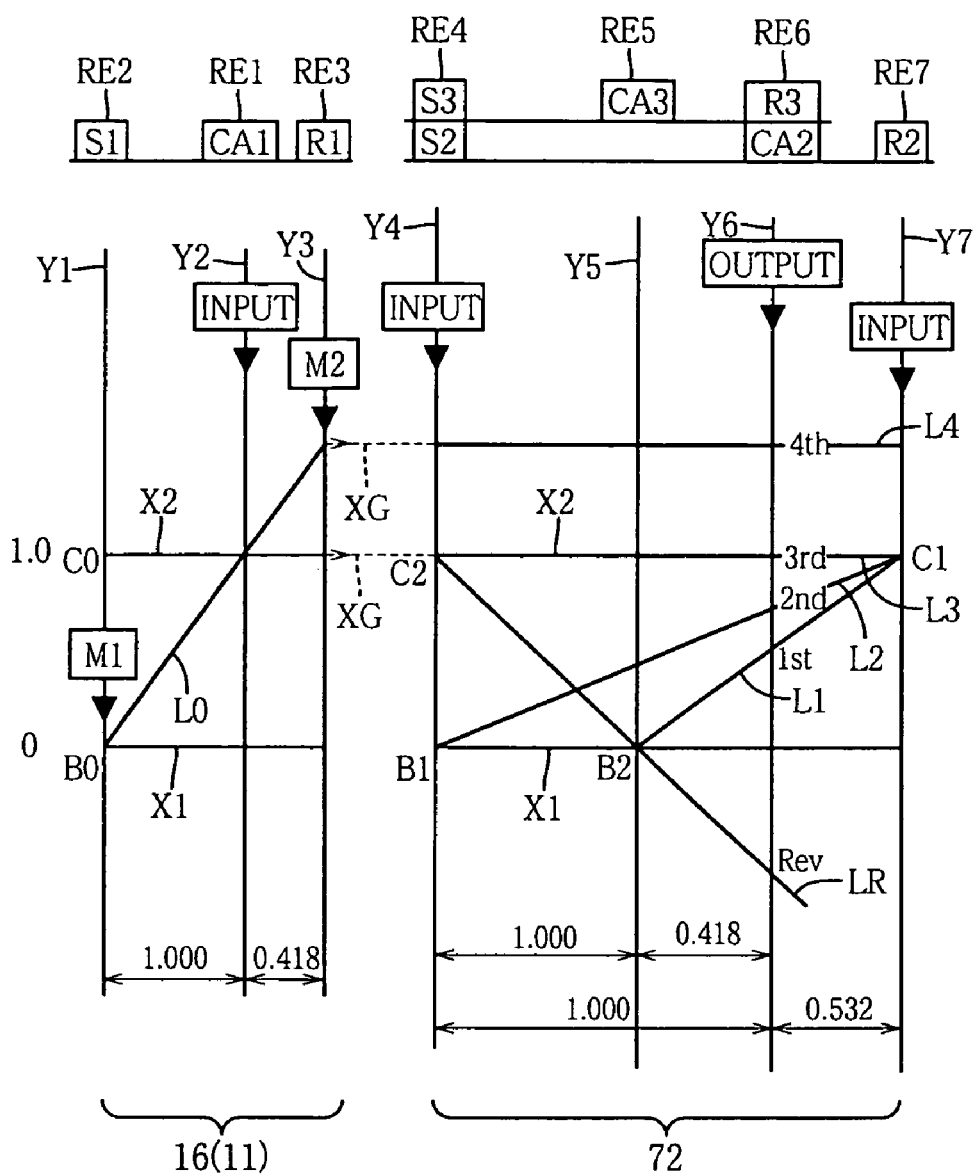
FIG. 21 is a collinear chart showing relative rotational speeds of a plurality of rotary elements incorporated in the drive apparatus of FIG. 19 as operated in the step-variable shifting action, in different drive positions of the drive system.

Referring next to FIGS. 19-21, there will be described a vehicle drive system which is constructed according to a second embodiment of the invention. This vehicle drive system is substantially identical with the vehicle drive system of the above-described first embodiment except that the transmission mechanism 10 is replaced with a transmission mechanism 70 which is different in construction from the transmission mechanism 10. In the following description as to the second embodiment, the same reference signs as used in the above-described first embodiment will be used to identify the functionally corresponding elements.

FIG. 19 is a schematic view for explaining an arrangement of the transmission mechanism 70. FIG. 20 is a table indicating gear positions of the transmission mechanism 70, and different combinations of engaged states of the hydraulically operated frictional coupling devices for respectively establishing those gear positions. FIG. 21 is a collinear chart for explaining shifting operation of the transmission mechanism 70.

The transmission mechanism 70 includes the power distributing mechanism 16, which has the first planetary gear set 24 of single-pinion type having a gear ratio ρ1 of about 0.418, for example, and the switching clutch C0 and the switching brake B0, as in the above-described first embodiment. The transmission mechanism 70 further includes an automatic transmission portion 72 which has three forward-drive positions and which is interposed between and connected in series to the power distributing mechanism 16 and the output shaft 22 through the power transmitting member 18. The transmission portion 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first-gear position (first-speed position) through a fourth-gear position (fourth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 20. Those gear positions have respective speed ratios γ(=input shaft speed $N_{IN}$/rotational output shaft speed $N_{OUT}$) which change substantially in geometric progression. In particular, it is noted that the differential portion 11 or power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present transmission mechanism 70, therefore, a step-variable transmission is constituted by the transmission portion 72, and the power distributing mechanism 16 which is placed in the fixed-speed-ratio shifting state by engagement of the switching clutch C0 or switching brake B0. Further, a continuously variable transmission is constituted by the transmission portion 72, and the power distributing mechanism 16 which is placed in the continuously-variable shifting state, with none of the switching clutch C0 and brake B0 being engaged.

Where the transmission mechanism 70 functions as the step-variable transmission, for example, the first-gear position having the highest speed ratio γ1 of about 2.804, for example, is established by engaging actions of the switching clutch C0, first clutch C1 and second brake B2, and the second-gear position having the speed ratio γ2 of about 1.531, for example, which is lower than the speed ratio γ1, is established by engaging actions of the switching clutch C0, first clutch C1 and first brake B1, as indicated in FIG. 20. Further, the third-gear position having the speed ratio γ3 of about 1.000, for example, which is lower than the speed ratio γ2, is established by engaging actions of the switching clutch C0, first clutch C1 and second clutch C2, and the fourth-gear position having the speed ratio γ4 of about 0.705, for example, which is lower than the speed ratio γ3, is established by engaging actions of the first clutch C1, second clutch C2, and switching brake B0. Further, the reverse-gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0, or by engaging none of the frictional coupling devices, as in the first embodiment. That is, while the neutral position N is selected, the switching clutch C0 is engaged except during the generation of the electric energy by the first electric motor M1 and/or the second electric motor M2, and is released during the generation of the electric energy (see FIG. 20).

Where the transmission mechanism 70 functions as the continuously-variable transmission, on the other hand, both switching clutch C0 and the switching brake B0 are both released, so that the differential portion 11 or power distributing mechanism 16 functions as the continuously variable transmission, while the transmission portion 72 connected in series to the power distributing mechanism 16 functions as the step-variable transmission, whereby the speed of the rotary motion transmitted to the transmission portion 72 placed in one of the first-gear, second-gear and third-gear positions, namely, the rotational speed of the power transmitting member 18 is continuously changed, so that the speed ratio of the drive apparatus when the transmission portion 72 is placed in one of those gear positions is continuously variable over a predetermined range. Accordingly, the speed ratio of the transmission portion 72 is continuously variable across the adjacent gear positions, whereby the overall speed ratio γT of the transmission mechanism 70 is continuously variable.

The collinear chart of FIG. 21 indicates, by straight lines, a relationship among the rotational speeds of the rotary elements in each of the gear positions of the transmission mechanism 70, which is constituted by the differential portion 11 or power distributing mechanism 16 functioning as the continuously-variable shifting portion or first shifting portion, and the transmission portion 72 functioning as the step-variable shifting portion or second shifting portion. The collinear chart of FIG. 21 indicates the rotational speeds of the individual elements of the power distributing mechanism 16 when the switching clutch C0 and brake B0 are released, and the rotational speeds of those elements when the switching clutch C0 or brake B0 is engaged, as in the above-described first embodiment.

In FIG. 21, four vertical lines Y4, Y5, Y6 and Y7 corresponding to the transmission portion 72 respectively represent the relative rotational speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the transmission portion 72, the fourth rotary element RE4 is selectively connected to the power transmitting member 18 through the second clutch C2, and is selectively fixed to the casing 12 through the first brake B1. The fifth rotary element RE5 is selectively fixed to the casing 12 through the second brake B2. The sixth rotary element RE6 is fixed to the output shaft 22 of the transmission portion 72. The seventh rotary element RE7 is selectively connected to the power transmitting member 18 through the first clutch C1.

When the first clutch C1 and the second brake B2 are engaged, the transmission portion 72 is placed in the first-speed position. The rotational speed of the output shaft 22 in the first-speed position is represented by a point of intersection between the vertical line Y6 indicative of the rotational speed of the sixth rotary element RE6 fixed to the output shaft 22 and an inclined straight line L1 which passes a point of intersection between the vertical line Y7 indicative of the rotational speed of the seventh rotary element RE7 and the horizontal line X2, and a point of intersection between the vertical line Y5 indicative of the rotational speed of the fifth rotary element RE5 and the horizontal line X1. Similarly, the rotational speed of the output shaft 22 in the second-speed position established by the engaging actions of the first clutch C1 and first brake B1 is represented by a point of intersection between an inclined straight line L2 determined by those engaging actions and the vertical line Y6 indicative of the rotational speed of the sixth rotary element RE6 fixed to the output shaft 22. The rotational speed of the output shaft 22 in the third-speed position established by the engaging actions of the first clutch C1 and second clutch C2 is represented by a point of intersection between an inclined straight line L3 determined by those engaging actions and the vertical line Y6 indicative of the rotational speed of the sixth rotary element RE6 fixed to the output shaft 22. In the first-speed through third-speed positions in which the switching clutch C0 is placed in the engaged state, the seventh rotary element RE7 is rotated at the same speed as the engine speed $N_E$, with the drive force received from the power distributing mechanism 16. When the switching clutch B0 is engaged in place of the switching clutch C0, the sixth rotary element RE6 is rotated at a speed higher than the engine speed $N_E$, with the drive force received from the differential portion 11 or power distributing mechanism 16. The rotational speed of the output shaft 22 in the fourth-speed position established by the engaging actions of the first clutch C1, second clutch C2 and switching brake B0 is represented by a point of intersection between a horizontal line L4 determined by those engaging actions and the vertical line Y6 indicative of the rotational speed of the sixth rotary element RE6 fixed to the output shaft 22. The rotational speed of the output shaft 22 in the reverse drive position R established by the engaging actions of the second clutch C2 and second brake B2 is represented by a point of intersection between an inclined straight line LR determined by those engaging actions and the vertical line Y6 indicative of the rotational speed of the sixth rotary element RE6 fixed to the output shaft 22.

The transmission mechanism 70 of the second embodiment is also constituted by the differential portion 11 or power distributing mechanism 16 functioning as the continuously-variable shifting portion or first shifting portion, and the transmission portion 72 functioning as the step-variable shifting portion or second shifting portion, so that the present transmission mechanism 70 has advantages similar to those of the first embodiment.

While the embodiments of the present invention have been described above in detail by reference to the drawings, the present invention may be otherwise embodied.

Each of the transmission mechanisms 10, 70 according to the embodiments described above is switchable between the continuously-variable shifting state in which the transmission mechanism functions as an electrically controlled continuously variable transmission, and the step-variable shifting state in which the transmission mechanism functions as a step-variable transmission, by switching the differential portion 11 or power distributing mechanism 16 between its differential state and non-differential state. This manner of switching between the continuously-variable shifting state and the step-variable shifting state is one mode of switching of the shifting state as a result of the switching of the differential portion 11 or power distributing mechanism 16 between the differential and non-differential states. For example, the speed ratio of the differential portion 11 or power distributing mechanism 16 may be variable in steps rather than continuously even in its differential state, so that the transmission mechanism functions as a step-variable transmission in the differential state of the differential portion 11 or power distributing mechanism 16. In other words, the differential state and non-differential state of each of the transmission mechanisms 10, 70 does not necessarily correspond to the continuously-variable shifting state and the step-variable shifting state, respectively, and each of the transmission mechanisms 10, 70 is not arranged to be switchable between the continuously-variable and step-variable shifting states. The principle of the present invention merely requires the switching between the differential state and the non-differential state (locked state) of the transmission mechanism 10, 70 (the differential portion 11 or power distributing mechanism 16).

In the illustrated embodiments, the power-transmitting-path disconnection determiner 62 is arranged to determine whether or not the transmission portion 20, 72 is placed in its power-transmission disconnecting state, on the basis of the signal supplied from the shift-position sensor and indicative of the currently selected operating position of the shift lever 51. However, where the vehicle drive system is adapted to effect a so-called "neutral control" by which the transmission portion 20, 72 is automatically placed in its power disconnecting state when a predetermined condition is satisfied (e.g., when the angle of opening of the throttle valve and the vehicle running velocity V are both zero with a brake operating member such as a foot brake being operated), the power-transmitting-path disconnection determiner 62 may be arranged to determine that the transmission portion 20, 72 is placed in its power-transmission disconnecting state not only when the shift lever 51 is placed in the corresponding operating position but also when the predetermined condition is satisfied, so that the power distributing mechanism 16 is placed in its differential state when the electricity generation is intended with the predetermined condition being satisfied.

In the power distributing mechanism 16 in the illustrated embodiments, the first carrier CA1 is fixed to the engine 8, and the first sun gear S1 is fixed to the first electric motor M1, while the first ring gear R1 is fixed to the power transmitting member 18. However, this arrangement of connection is not essential, provided the engine 8, first electric motor M1 and power transmitting member 18 are fixed to respective ones of the three elements CA1, S1 and R1 of the first planetary gear set 24.

Although the engine 8 is directly connected to the input shaft 14 in the illustrated embodiments, the engine 8 may be operatively connected to the input shaft 14 through gears, a belt or the like, and need not be disposed coaxially with the input shaft 14.

In the illustrated embodiments, each of the first electric motor M1 and second electric motor M2 is disposed coaxially with the input shaft 14, and the first electric motor M1 is fixed to the first sun gear S1 while the second electric motor M2 is fixed to the power transmitting member 18. However, this arrangement is not essential. For example, the first electric motor M1 may be fixed to the first sun gear S1 through gears, a belt or the like, and the second electric motor M2 may be fixed to the power transmitting member 18 through gears, a belt or the like.

Although the power distributing mechanism 16 described above is provided with the switching clutch C0 and the switching brake B0, the power distributing mechanism 16 need not be provided with both of these switching clutch C0 and brake B0, and may be provided with only one of the switching clutch C0 and brake B0. Although the switching clutch C0 is arranged to selectively connect the sun gear S1 and carrier CA1 to each other, the switching clutch C0 may be arranged to selectively connect the sun gear S1 and ring gear R1 to each other, or the carrier CA1 and ring gear R1. In essence, the switching clutch C0 is required to be a switching device arranged to connect any two of the three members of the first planetary gear set 24.

The switching clutch C0 is engaged to establish the neutral position N in the transmission mechanisms 10, 70, except during the generation of the electric energy by the first electric motor M1 and/or the second electric motor M2. However, the neutral position N need not be established by engaging the switching clutch C0.

Each of the hydraulically operated frictional coupling devices such as the switching clutch C0 and switching brake B0 used in the illustrated embodiments may be a coupling device of a magnetic-powder type, an electromagnetic type or a mechanical type, such as a powder (magnetic powder) clutch, an electromagnetic clutch and a meshing type dog clutch.

In the illustrated embodiments, the second electric motor M2 is fixed to the power transmitting member 18. However, the second electric motor M2 may be fixed to the output shaft 22, or to a rotary member of the automatic transmission portion 20, 72.

In the illustrated embodiments, the automatic transmission portion 20, 72 constituting the part of the power transmitting path is disposed between the drive wheels 38 and the power transmitting member 18 which is the output member of the differential portion 11 or power distributing mechanism 16. However, the automatic transmission portion 20, 72 may be replaced by any other type of power transmitting device such as a continuously variable transmission (CVT) as a kind of automatic transmission. Where a continuously variable transmission (CVT) is provided, the transmission mechanism 10, 70 may be placed in the step-variable shifting state when the power distributing mechanism 16 is placed in its fixed-speed-ratio shifting state. The step-variable shifting state is interpreted to mean a state in which a vehicle drive power or force is transmitted primarily through a mechanical power transmitting path, without using an electric path. The continuously variable transmission (CVT) may be arranged to establish a plurality of predetermined fixed speed ratios which correspond to those of the gear positions of a step-variable transmission and which are stored in a memory.

In the illustrated embodiments, each of the transmission portions 20, 72 is connected in series to and coaxially with the differential portion 11 through the power transmitting member 18. However, the transmission portion 20, 72 may be disposed on a counter shaft disposed in parallel with the input shaft 14. In this case, the differential portion 11 and the transmission portion 20, 72 are connected to each other for transmission of a drive force therebetween, by a counter gear pair, or a power transmitting device such as a set of sprocket wheels and a chain.

The power distributing mechanism 16 provided in the illustrated embodiments may be replaced by a differential gear device including a pinion rotated by the engine, and a pair of bevel gears which mesh with the pinion and which are respectively operatively connected to the first and second electric motors M1, M2.

Although the power distributing mechanism 16 is constituted by one planetary gear set in the illustrated embodiments, it may be constituted by two or more planetary gear sets and arranged to be operable as a transmission having three or more gear positions when placed in its fixed-speed-ratio shifting state (non-differential state).

In the illustrated embodiments, the shift lever 51 placed in its manual position M permits the manual selection of one of the five shift ranges "D", "4", "3", "2" and "L". However, the shift lever 51 placed in its manual position M may permit a manual selection of a desired one of the gear positions which correspond to the lowest speed ratios of the respective shift ranges. In this modified arrangement, one of the first through fourth gear positions is selected by manually moving the shift lever 51 to the shift-up position "+" or the shift-down position "−" of the manual position M.

While the switch 48 is of a seesaw type in the illustrated embodiments, the switch 48 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The switch 48 may or may not have a neutral position. Where the switch 48 does not have the neutral position, an additional switch may be provided to enable and disable the switch 48. The function of this additional switch corresponds to the neutral position of the switch 48.

In the illustrated embodiments, the electric oil pump 32 constitutes the hydraulic pump for supplying the pressurized working fluid to the transmission mechanism 10. However, the hydraulic pump may be constituted by, in addition to the electric oil pump 32, a variable volume hydraulic pump which is arranged to be driven by the engine 8. In this modified arrangement, too, the electric control pump 32 may be controlled such that the pressure of the working fluid is reduced or substantially zeroed when the electricity generation is intended during disconnection of the power transmitting path in the transmission portion 20, 72, for reducing the electric energy consumed by activation of the pump 32 and an amount of the working fluid supplied from the variable volume hydraulic pump, and improving the fuel economy of the vehicle.

While the embodiments of the present invention have been described above for illustrative purpose only, it is to be understood that the present invention may be embodied with various changes and improvements, which may occur to those skilled in the art.

What is claimed is:

1. A control apparatus for controlling a vehicle drive apparatus,
the vehicle drive apparatus including: (i) a power transmitting member; (ii) a differential mechanism (11) which has a first element connected to an engine, a second element connected to a first electric motor, and a third element connected to a second electric motor and the power transmitting member, and which distributes a drive power of the engine to the first electric motor and the power transmitting member; (iii) an automatic transmission constituting (20) at least a part of a power transmitting path between the power transmitting member and a drive wheel; and (iv) a differential-state switching device (C0, B0) operable to selectively place the differential mechanism in a differential state thereof for performing an electric differential and in a non-differential state thereof for locking the electric differential,
the control apparatus including a switching device controller (60) operable to cause the differential-state switching device to place the differential mechanism in the differential state, at least during generation of an electric energy by at least one of the first and second electric motors while the power transmitting path is disconnected.

2. The control apparatus for controlling a vehicle drive apparatus according to claim 1, wherein the differential mechanism functions as a continuously-variable transmission when switched to the differential state, and functions as a step-variable transmission when switched to the non-differential state.

3. The control apparatus for controlling a vehicle drive apparatus according to claim 1, wherein the vehicle drive apparatus further includes a switch (48) for switching the differential mechanism to the differential state or the non-differential state, and even when the non-differential state is selected by the switch, upon the electricity generation by the first and second electric motor while the power transmitting path is disconnected, the differential mechanism is switched to the differential state.

4. The control apparatus for controlling a vehicle drive apparatus according to claim 1, wherein the automatic transmission (20) includes a first planetary gear set (26), a second planetary gear set (28) and a third planetary gear set (30), and has five rotary elements each of which is constituted by at least one of sun gears, carriers and ring gears of the first, second and third planetary gear sets, rotating speeds of the five rotary elements being indicated along respective straight lines in a collinear chart in which the five rotary elements are arranged as a first element, a second element, a third element, a fourth element and an fifth element, respectively, in the order of description in a direction from one of opposite ends of the collinear chart toward the other end, the first element (RE4) being selectively connected through a second clutch (C2) to the power transmitting member and selectively connected through a first brake (B1) to the stationary member (12), the second element (RE5) being selectively fixed through a second brake (B2) to the stationary member, the third element (RE6) being selectively fixed through a third brake (B3) to the stationary member, the fourth element (RE7) being fixed to an output rotary member (22) of the automatic transmission, the fifth element (RE8) being selectively connected through a first clutch (C1) to the power transmitting member, the automatic transmission having a plurality of operating positions that are established by engaging actions of respective combinations of the first clutch, second clutch, first brake, second brake and third brake.

5. The control apparatus for controlling a vehicle drive apparatus according to claim 1, wherein the automatic transmission (20) includes a first planetary gear set (26) of single-pinion type, a second planetary gear set (28) of single-pinion type and a third planetary gear set (30) of single-pinion type, the first planetary gear set having a first sun gear (S2), a first carrier (CA2) and a first ring gear (r2), the second planetary gear set having a second sun gear (S3), a second carrier (CA3) and a second ring gear (R3), and the third planetary gear set having a third sun gear (S4), a third carrier (CA4) and a third ring gear (R4), the first sun gear and the second sun gear being selectively connected through a second clutch (C2) to the power transmitting member and selectively fixed through a first brake (B1) to the stationary member, and the third ring gear being selectively fixed through a third brake (B3) to the stationary member, and wherein the first ring gear, the second carrier and the third carrier are fixed to an output rotary member (22) of the automatic transmission, and the second ring gear and the third sun gear are selectively connected through a first clutch to the power transmitting member.

6. The control apparatus for controlling a vehicle drive apparatus according to claim 5, the automatic transmission further includes a switch clutch (C1, C2) disposed at input side thereof to connect the automatic transmission with or disconnect from the transmitting member.

7. The control apparatus for controlling a vehicle drive apparatus according to claim 1, wherein the automatic transmission (72) includes a first planetary gear set (26) and a second planetary gear set (28), and has four rotary elements each of which is constituted by at least one of sun gears, carriers and ring gears of the first and second planetary gear sets, rotating speeds of the fourth rotary elements being indicated along respective straight lines in a collinear chart in which the four rotary elements are arranged as a first element, a second element, a third element and a fourth element, respectively, in the order of description in a direction from one of opposite ends of the collinear chart toward the other end, the first element (RE4) being selectively connected through a second clutch (C2) to the power transmitting member and selectively fixed through a first brake (B1) to the stationary member (12), the second element (RE5) being selectively fixed through a second brake (B2) to the stationary member, and the third element (RE6) being fixed to an output rotary member (22) of the automatic transmission, the fourth element (RE7) being selectively connected through a first clutch (C1) to the power transmitting member, the automatic transmission having a plurality of operating positions that are established by engaging actions of respective combinations of the first clutch, second clutch, first brake and second brake.

8. The control apparatus for controlling a vehicle drive apparatus according to claim 1, wherein the automatic transmission (72) includes a first planetary gear set (26) of single-pinion type and a second planetary gear set (28) of single-pinion type, the first planetary gear set having a first sun gear (S2), a first carrier (CM) and a first time gear (R2), and the second planetary gear set having a second gear (S3), a second carrier (CA3) and a second ring gear (R3), the first sun gear and the second sun gear being selectively connected through a second clutch (C2) to the power transmitting member and selectively fixed through a first brake (B1) to the stationary member (12), the second carrier being selectively fixed through a second brake (B2) to the stationary member, and the first carrier and the second ring gear being fixed to an output rotary element (22) of the automatic transmission, the first ring gear being selectively connected through a first clutch (C1) to the power transmitting member.

9. The control apparatus for controlling a vehicle drive apparatus according to claim 1, wherein the differential-state switching device selectively places the differential mechanism in the differential state thereof in which at least the second and third elements are rotatable at respective speeds different from each other, and in the non-differential state thereof in which at least the second and third elements are not rotatable at respective speeds different from each other.

10. The control apparatus for controlling a vehicle drive apparatus according to claim 9, wherein the control apparatus further including a power-transmitting-path disconnection determiner (62) operable to determine disconnection of the power transmitting path when the automatic transmission is placed in one of a neutral position thereof and a parking position thereof, and the switching device controller causes the differential-state switching device to place the differential mechanism in the differential state, at least during the generation of the electric energy by at least one of the first and second electric motors when the power-transmitting-path disconnection determiner determines the disconnection of the power transmitting path.

11. The control apparatus for controlling a vehicle drive apparatus according to claim 9, wherein the control apparatus further includes generation controller (66) operable to control the first and second electric motors during the generation of the electric energy while the power transmitting path is disconnected, to be operated at respective operating points thereof different from each other, for generating the electric energy.

12. The control apparatus for controlling a vehicle drive apparatus according to claim 11, wherein said generation controller controls the first and second electric motors during the generation of the electric energy while the power transmitting path is disconnected, such that the electric energy is generated by rotations of the respective first and second electric motors, with at least one of rotational speed and torque of the first electric motor being different from that of the second electric motor.

13. The control apparatus for controlling a vehicle drive apparatus according to claim 11, wherein said generation controller controls the first and second electric motors during the generation of the electric energy, to maximize a generation efficiency thereof.

14. The control apparatus for controlling a vehicle drive according to claim 9 wherein the vehicle driving apparatus further includes an electrically-operated hydraulic pump (32), and the control apparatus further includes a pump controller (68) operable to control the electrically-operated hydraulic pump which supplies a pressurized working fluid to the automatic transmission, such that a pressure of the working fluid supplied to the automatic transmission is reduced to substantially zero, at, least during the generation of the electric energy while the power transmitting path is disconnected.

15. The control apparatus for controlling a vehicle drive according to claim 9, wherein the vehicle drive apparatus further includes an electrically-operated hydraulic pump (32); and
the control apparatus further includes a generation request determiner (66) operable to determined request of the generation of the electric energy, on the basis of an amount of the electric energy remaining in an electric-energy storage device, a power-transmitting-path disconnection determiner (62) operable to determine disconnection of the power transmitting path, depending upon whether or not the automatic transmission is placed in one of a neutral position thereof and a parking position thereof, and a pump controller (68) operable to control the electrically-operated hydraulic pump which supplies a pressurized working fluid to the automatic transmission,
wherein a pressure of the working fluid supplied to the automatic transmission is made lower when an affirmative decision is obtained in both of said generation request determiner and the power transmitting-path disconnection determiner, respectively, than when a negative decision is obtained in at least one of the generation request determiner and power-transmitting-path disconnection determiner, respectively.

16. A vehicle drive system comprising:
(a) vehicle drive apparatus including: (i) a power transmitting member; (ii) a differential mechanism which has a first element connected to an engine, a second element connected to a first electric motor, and a third element connected to a second electric motor and the power transmitting member, and which distributes a drive power of the engine to the first electric motor and said power transmitting member; (iii) an automatic transmission constituting at least a part of a power transmitting path between said power transmitting member and a drive wheel; and (iv) a differential-state switching device operable to selectively place said differential mechanism in a differential state thereof for performing an electric differential, and in a non-differential state thereof for locking the electric differential; and
(b) a control apparatus apparatus including a switching device controller operable to cause the differential-state switching device to place the differential mechanism in the differential state, at least during generation of an electric energy by at least one of the first and second electric motors while the power transmitting path is disconnected.

17. The vehicle drive system according to claim 16,
wherein the automatic transmission is connectable to the power transmitting member through at least one clutch (C1,C2) which is disposed between the automatic transmission and the power transmitting member,
and wherein at least one clutch is selectively engaged and disengaged for connecting and disconnecting the automatic transmission to and from the power transmitting member, so as to selectively connecting and disconnecting said power transmitting path.

* * * * *

UNITED STATES PATENT AND TRADEMARK OFFICE
CERTIFICATE OF CORRECTION

PATENT NO. : 7,249,642 B2  Page 1 of 1
APPLICATION NO. : 11/144694
DATED : July 31, 2007
INVENTOR(S) : Atsushi Tabata et al.

It is certified that error appears in the above-identified patent and that said Letters Patent is hereby corrected as shown below:

| Column | Line | |
|---|---|---|
| 6 | 34 | Change "clutch CO" to --clutch C0--. |
| 38 | 3 | Change "(CM)" to --CA2--. |
| 39 | 27 | Before "power-transmitting" insert --the--. |

Signed and Sealed this

Twenty-fourth Day of June, 2008

JON W. DUDAS
*Director of the United States Patent and Trademark Office*